United States Patent [19]
Tucker et al.

[11] Patent Number: 5,828,807
[45] Date of Patent: Oct. 27, 1998

[54] OPTICAL NETWORK UNIT (ONU) MECHANICAL ENCLOSURE

[75] Inventors: Russell L. Tucker, San Ramon; Mark S. McCall, Santa Rosa; Bernabe R. Lovina, Benecia, all of Calif.

[73] Assignee: Next Level Communications, Rohnert Park, Calif.

[21] Appl. No.: 647,436

[22] Filed: Apr. 30, 1996

[51] Int. Cl.$^6$ .......................................... G02B 4/00
[52] U.S. Cl. ............................................. 385/135
[58] Field of Search .................................... 385/134, 135, 385/136, 137, 138, 139, 147

[56] References Cited

U.S. PATENT DOCUMENTS

| | | | |
|---|---|---|---|
| 5,274,731 | 12/1993 | White | 385/134 |
| 5,325,455 | 6/1994 | Henson et al. | 385/137 |
| 5,506,927 | 4/1996 | Kitajima et al. | 385/135 |

Primary Examiner—Akm E. Ullah
Attorney, Agent, or Firm—Skjerven, Morrill, MacPherson, Franklin & Friel; David W. Heid

[57] ABSTRACT

A mechanical enclosure for an optical network unit (ONU). The enclosure includes a frame having a first opening and a second opening opposite the first opening. A partition divides the frame into a first compartment which houses the electronics and optics of the ONU, and a second compartment which houses drop terminal blocks and coaxial cable ports of the ONU. Each compartment has a dedicated door to provide access to the associated compartment. Water-tight seals are provided for each element which passes through the partition, thereby providing electronics/optics compartment with a water-tight environment. Drop cables leave the ONU enclosure through grommets which are held in the second compartment of the frame. The mechanical enclosure includes a support plate which supports various electronics/optics circuitry and a mounting plate which supports drop terminal blocks. Mounting brackets enable the enclosure to be mounted either vertically or horizontally. A hook assembly further enables the enclosure to be held in different positions to improve access to the compartments of the enclosure.

52 Claims, 24 Drawing Sheets

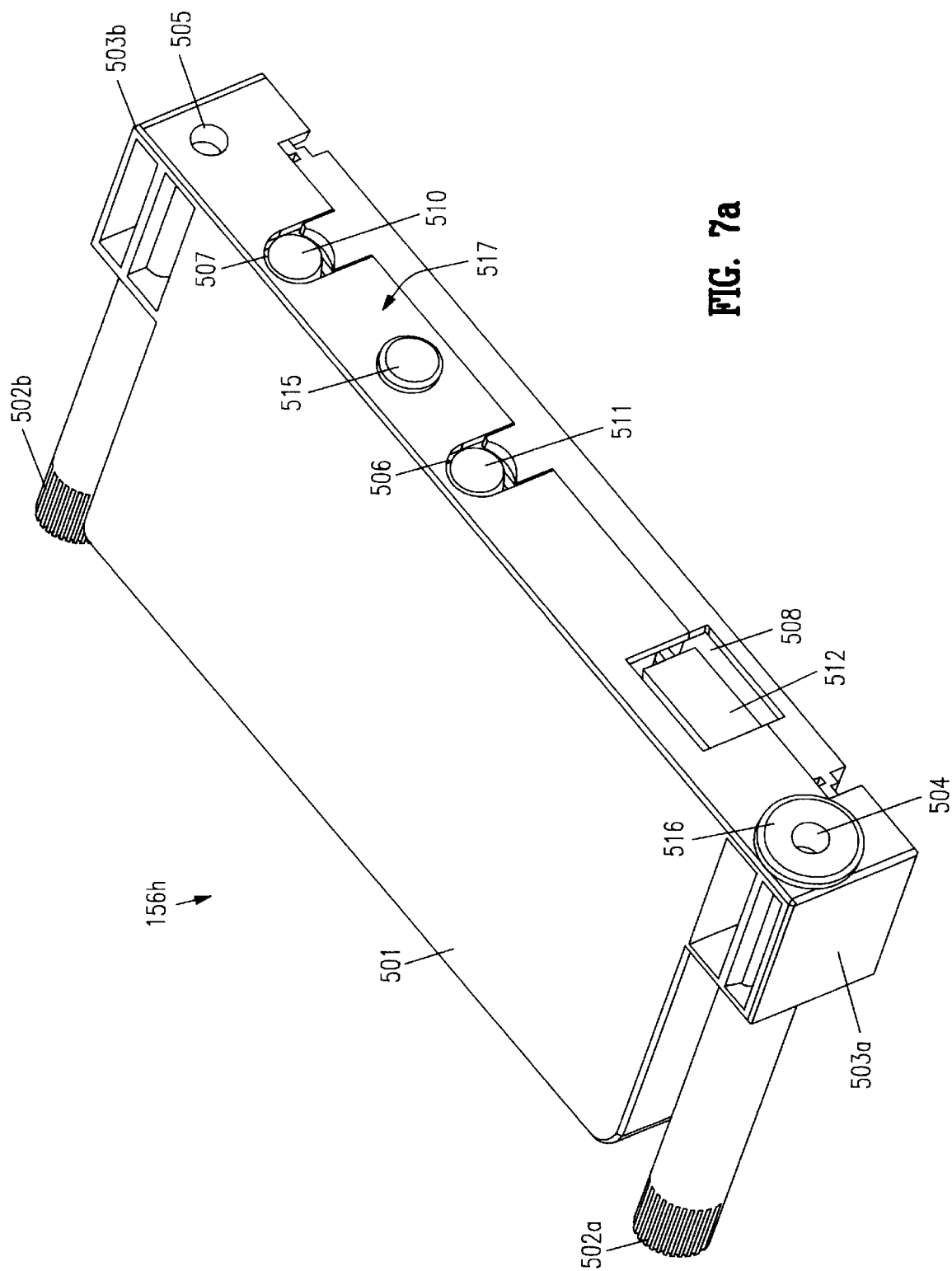

OPTICAL NETWORK UNIT (ONU) MECHANICAL ENCLOSURE

BACKGROUND OF THE INVENTION

1. Field of Invention

The present invention relates to a mechanical enclosure for elements of a communications system. More particularly, the invention relates to an optical network unit mechanical enclosure.

2. Description of Related Art

Optical network units (ONUs) are commonly used in fiber-to-the-curb communication systems. An optical network unit is a unit, typically located in the customers' neighborhood, which receives an optical fiber from a central office location. The optical network unit includes circuitry which converts the optical signals received on the fiber into electronic signals. These electronic signals are transmitted to customers on coaxial cables and/or single or multiple pair conductors (i.e., voice frequency (VF) drop cables). The optical network unit also provides circuitry which allows electrical signals received from the customers to be converted to optical signals which are transmitted back to the central office on the optical fiber.

Conventional ONU enclosures are suitable for a limited range of deployments. For instance, Raynet Corp. provides a narrowband 8-line ONU enclosure and a narrowband 16-line ONU enclosure, each being suitable for mounting in a vertical pedestal, but not for strand (horizontal) mounting. Raynet Corp. further provides a narrowband 32-line ONU enclosure which is suitable for vertical pole or wall mounting, but which is not suited for strand or horizontal pedestal mounting. Raynet Inc. also provides a narrowband 48-line ONU enclosure which is suitable for strand mounting, but is not suited for deployment in a vertical pedestal, pole or wall mounting. It would therefore be desirable to have an ONU enclosure suitable for mounting in both horizontal and vertical configurations.

In addition, conventional ONU enclosures require that a drop terminal block or blocks be mounted external to the ONU. Drop terminal blocks provide the industry-standard connection to the customer's VF drop cables. The drop terminal blocks most widely deployed in the United States are tested against Bellcore requirements, and are produced by a variety of manufacturers including Reliance Corp., Amp Inc., 3M Corp., and Raychem Corp. Because the drop terminal blocks are mounted externally, an additional housing is required to provide security and environmental protection for the drop terminal blocks. In addition, an outdoor cable must be used to provide environmental protection to the bundle of VF electrical conductors which connect the external drop terminal block or blocks to the ONU. Both the drop terminal block housing and the outdoor cable require mounting space and installation time. Conventional ONU enclosures which require that the drop terminal block or blocks be mounted external to the ONU enclosure include Raynet's 8-line narrowband ONU, 16-line narrowband ONU, 32-line narrowband ONU and 48-line narrowband ONU.

It would therefore be desirable to have an ONU enclosure which eliminates the previously described shortcomings of conventional ONU enclosures.

SUMMARY OF THE INVENTION

Accordingly, the present invention provides an ONU enclosure having a frame with a first opening and a second opening. A partition divides the frame into a first compartment for housing the electronics and optics of the ONU, and a second compartment for housing the drop terminal block or blocks of the ONU. A first door is coupled to the frame, and provides a covering for the first compartment. Similarly, a second door coupled to the frame provides a covering for the second compartment. The first and second doors have a gull-wing design which enables these doors to be rotated upward when the interior of the ONU is to be accessed. Catches or struts are provided to hold the first and second doors in an open position, thereby freeing the hands of a craftsperson working on the ONU when the ONU enclosure is mounted horizontally. Each door overlaps the frame when in an open position, thereby preventing rain from entering the first and second compartments. Each door also has an associated gasket which provides a seal between the door and its corresponding compartment. The gasket used to seal the first door is made of an elastomeric material which provides a water-tight seal.

Optical fiber and power supply conductors are received through corresponding openings in the first compartment of the enclosure. A water-tight seal is formed at each opening around the optical fiber and power supply conductors, respectively, thereby preventing moisture from entering the first compartment. In a particular embodiment, one or more routing structures are positioned on the exterior of the frame. One of the routing structures routes the optical fiber through an opening in the first compartment to the exterior of the frame. This routing structure ensures that the optical fiber is not bent past a minimum bend radius.

The partition includes an opening which is adapted to receive a plurality of twisted pair conductors. The twisted pair conductors which pass through the opening in the partition provide voice frequency (VF) communication pathways and power pathways between the first and second compartments. A water-tight seal is located between the opening in the partition and the twisted pair conductors, thereby preventing moisture from passing from the second compartment into the first compartment through the partition.

The partition further includes a plurality of coaxial cable bulkhead connectors which extend through the partition between the first and second compartments. The coaxial cable connectors and the partition are designed to prevent moisture from passing from the second compartment into the first compartment.

Consequently, when the first door is closed, moisture is prevented from entering the first compartment, thereby protecting the electronic and optic devices stored in the first compartment.

The ONU enclosure also includes a support plate which can be connected to the partition within the first compartment. The support plate provides a mechanical structure for mounting a plurality of electronics/optics devices within the first compartment. A printed circuit board, which provides interconnections between the electronics/optics devices, is fastened to the support plate. In a variation, the support plate and the attached printed circuit board are removed from the ONU enclosure and are used to support and interconnect the electronics/optics devices outside of the ONU enclosure in a controlled environment.

The ONU enclosure can also include a mounting plate, positioned in the second compartment, which is adapted to support one or more drop terminal blocks. The mounting plate can be removed and replaced with a different mounting plate to facilitate the use of many different types of drop terminal blocks. The drop terminal blocks have a network side which is typically connected to twisted pair conductors (VF and power) received from the first compartment, and a subscriber side which is typically connected to the VF drop cables which are routed to the customer's point of use. The VF drop cables are routed out of the second compartment through slots located on the underside of the second compartment. These slots are dimensioned to receive corresponding drop cable grommets, which are designed to receive the subscriber VF drop cables. Additional slots located on the underside of the second compartment are dimensioned to receive coaxial cable grommets, which are designed to receive coaxial drop cables. A plurality of cable guides located on the underside of the frame retain the coaxial drop cables and VF subscriber drop cables which are routed from the second compartment.

The second compartment can further include a plugged opening. The opening, when unplugged, is adapted to pass a bundled group of twisted pair conductors. In one embodiment, the bundled group of twisted pair conductors is connected directly to twisted pair conductors (VF and power) received from the first compartment. In this embodiment, the drop terminal blocks are not included in the second compartment. Instead, the bundled group of twisted pair conductors is routed out through the unplugged opening and connected to a drop terminal block or blocks which are located external to the ONU enclosure. Such drop terminal blocks can be located either in close proximity with the ONU enclosure or at a significant distance from the ONU enclosure.

In another embodiment, drop terminal blocks are included within the second compartment of the ONU enclosure, and the bundled group of twisted pair conductors is routed into the second compartment and connected to the network side of the drop terminal blocks. VF drop cables are connected to the subscriber side of the drop terminal blocks and exit the second compartment through the VF drop cable grommets at the underside of the second compartment. In this embodiment, the ONU enclosure operates as a conventional terminal block housing if the electronics/optics devices are not operating and the bundled group of twisted pair conductors are connected to the network.

Mounting brackets having various geometries are capable of being fastened to the ONU enclosure. Different mounting brackets, which are easily interchanged, enable the ONU enclosure to be supported either horizontally or vertically. When mounted horizontally in a pedestal, a hook assembly can be used in conjunction with the mounting brackets to support the ONU enclosure in two discrete positions. One position facilitates the installation of a pedestal cover without interference with the ONU enclosure. The other position facilitates access to the second compartment, which is typically accessed more frequently than the first compartment.

The ONU enclosure can further include a solar panel which is connected to the exterior surface of the frame to reduce the interior temperature of the enclosure when the ONU enclosure is deployed in locations exposed to direct sunlight, such as on a strand.

The present invention will be more fully understood in light of the following detailed description taken together with the drawings.

BRIEF DESCRIPTION OF THE DRAWINGS

FIGS. 7a and 7b are isometric view of a broadband interface unit and a telephone interface unit, respectively, in accordance with one embodiment of the invention;

DETAILED DESCRIPTION

Figure 1:
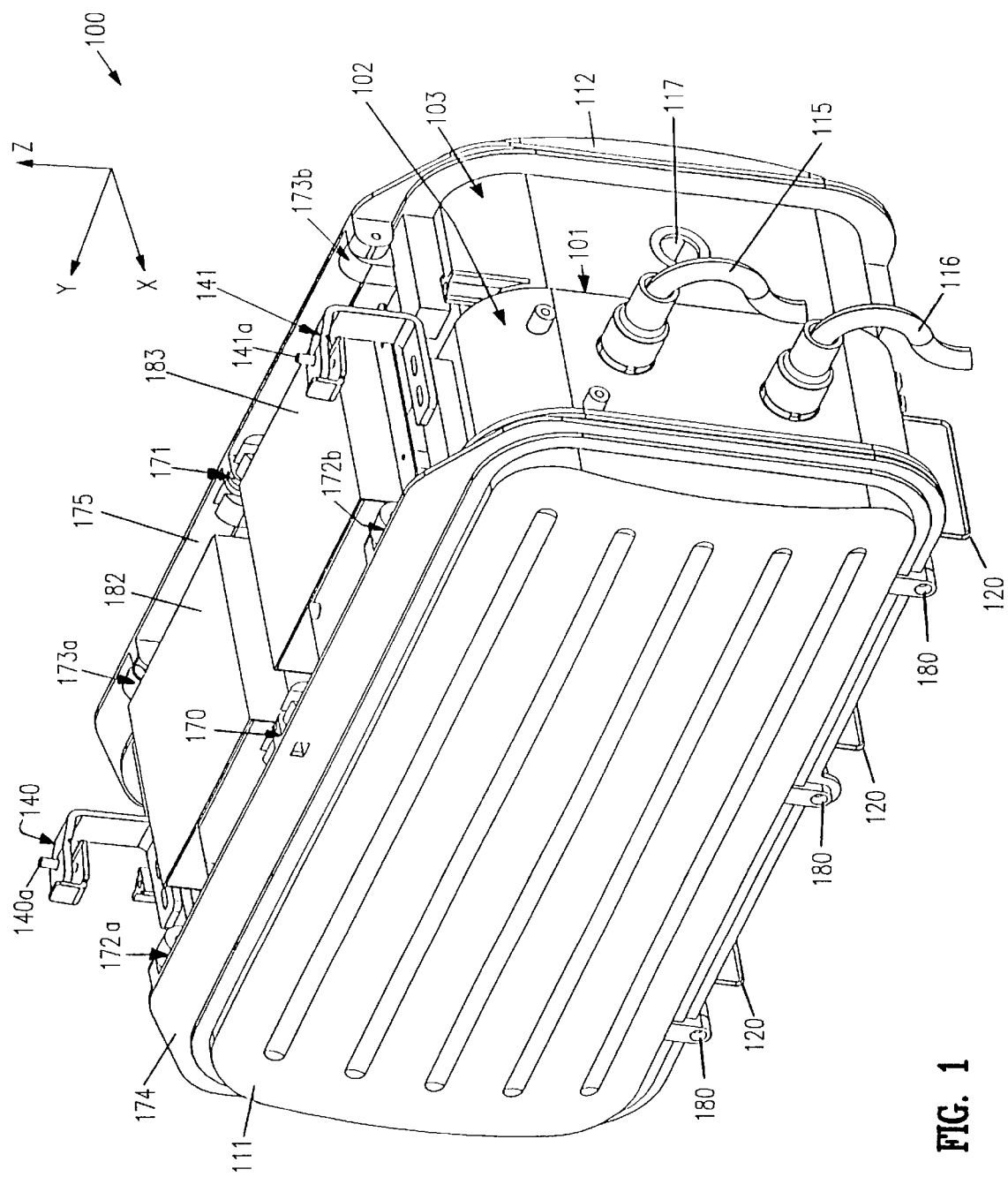
FIGS. 1 and 2 are isometric views of opposite sides of an ONU enclosure in accordance with one embodiment of the invention.
Figure 2:
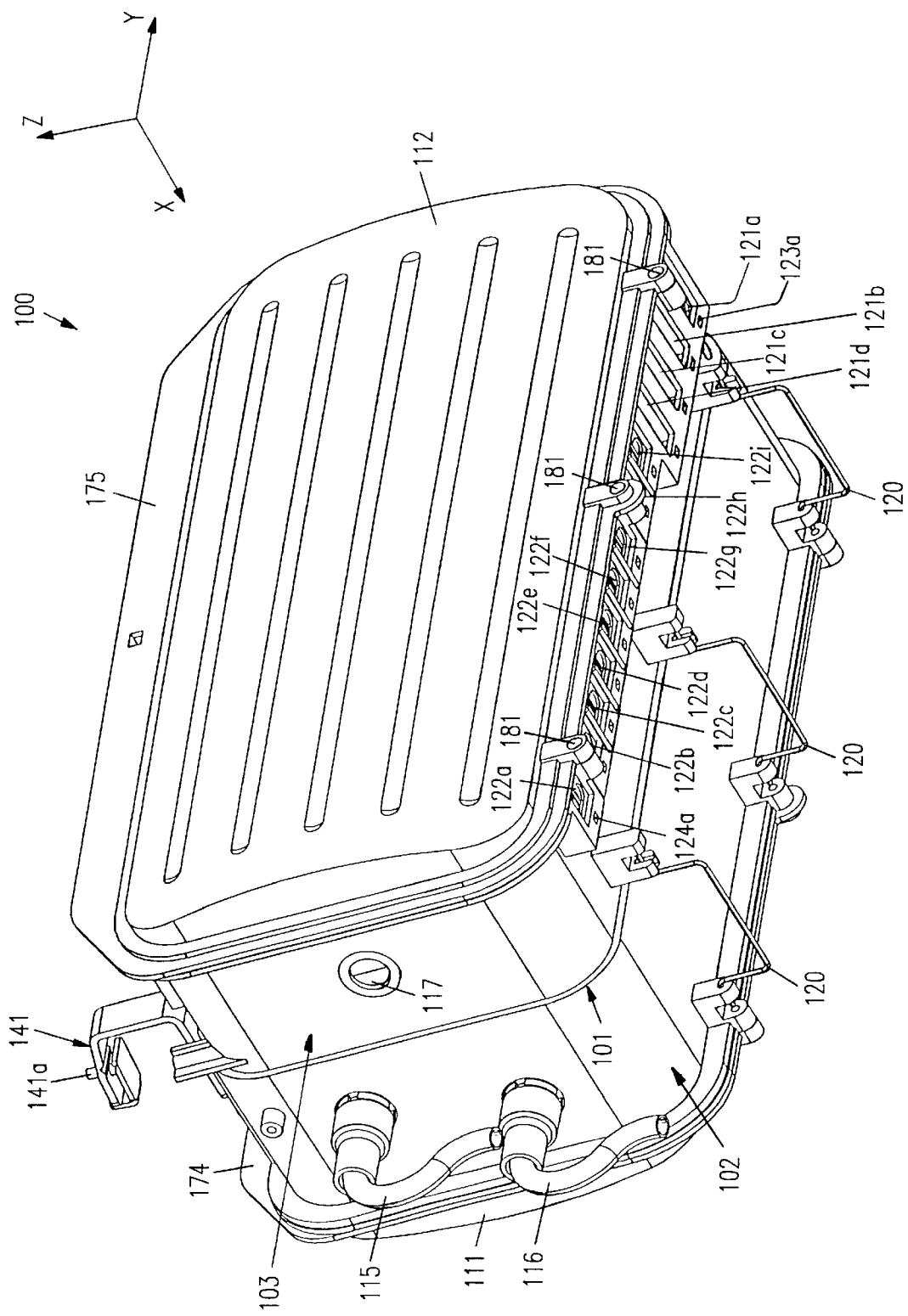
Figure 3:
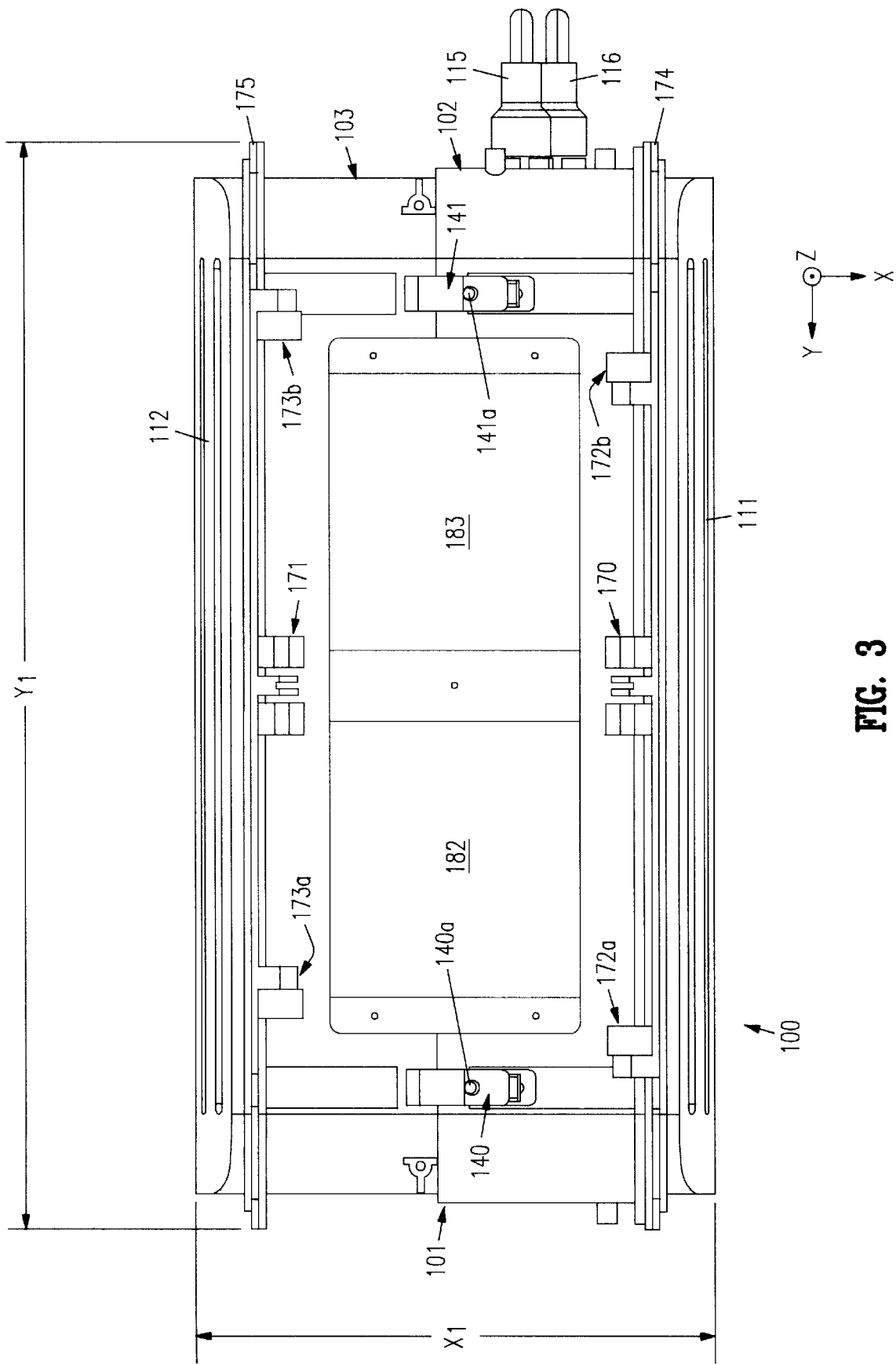
FIG. 3 is a top view of the ONU enclosure of FIGS. 1 and 2.
Figure 4:
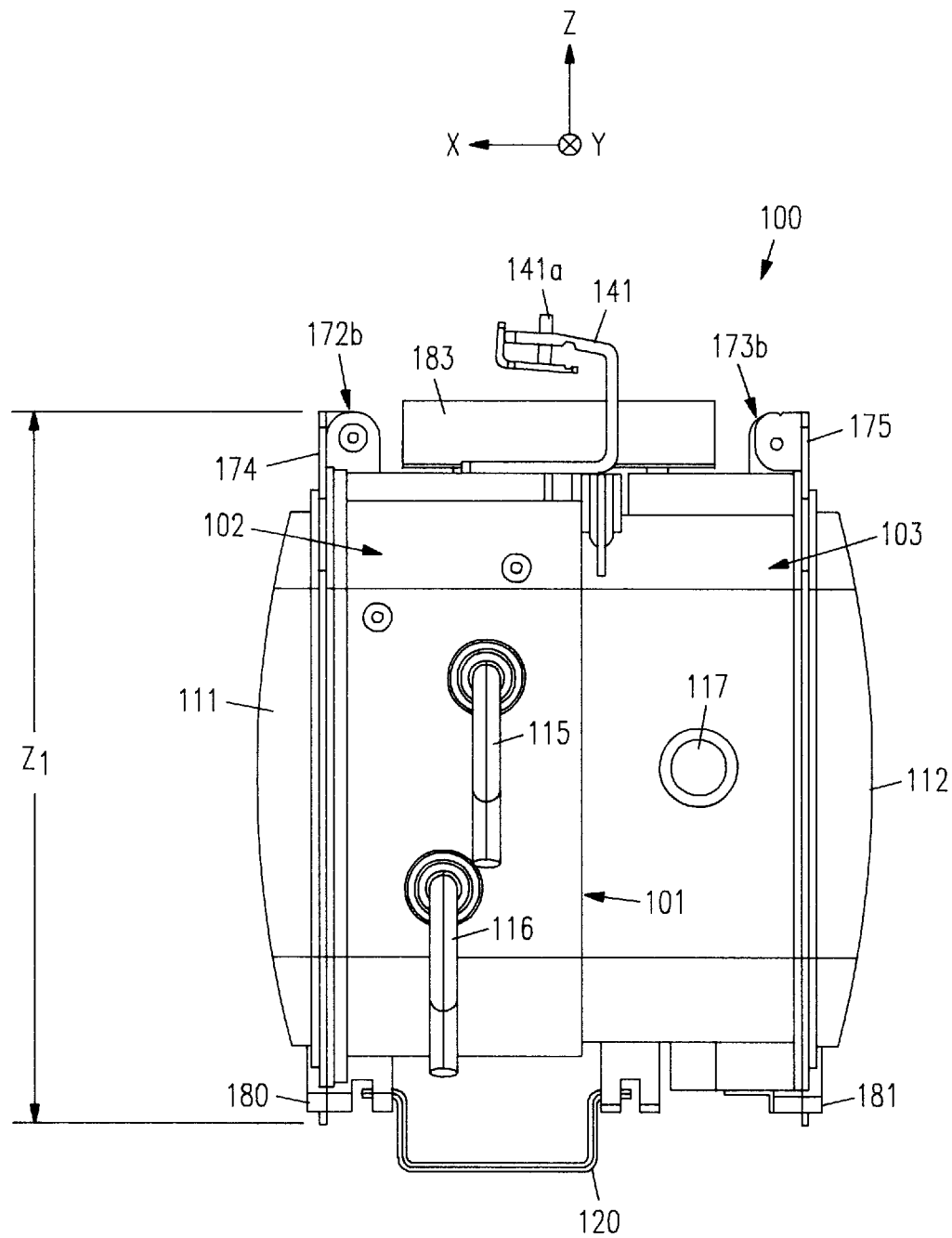
FIG. 4 is a side view of the ONU enclosure of FIGS. 1 and 2.

FIGS. 1, 2, 3 and 4 illustrate various views of a mechanical enclosure 100 for an optical network unit (ONU). More specifically, FIGS. 1 and 2 are isometric views of opposite sides of ONU enclosure 100. FIGS. 3 and 4 are top and side views, respectively, of ONU enclosure 100. FIGS. 1–4 are illustrated with an X-Y-Z coordinate system which is used throughout the specification and drawings.

ONU enclosure 100 includes frame 101, electronics/optics compartment 102, drop terminal compartment 103, electronics/optics compartment door 111, drop terminal compartment door 112, optional optical fiber/power cable routing structures 116 and 115, plugged opening 117, cable guides 120, coaxial cable retaining slots 121a–121d, VF/power drop cable retaining slots 122a–122i, mounting brackets 140 and 141, and solar panel 184 (which includes solar shade structures 182 and 183). Electronics/optics compartment 102 and drop terminal compartment 103 are separated by a partition 199 (See, FIG. 5).

Each of doors 111 and 112 are gull-wing doors which open by rotating about an axis parallel to the Y-axis. Electronics/optics door 111 rotates upward about frame hinges 170, 172a and 172b. One or more struts (not shown), which extend between frame 101 and door 111, can be provided to hold door 111 in an open position. A locking mechanism 180 is provided to retain door 111 in a closed position. In one embodiment, locking mechanism 180 includes three security screws which can only be accessed by a keyed allen wrench having a specified configuration. Other locking mechanisms are possible and considered within the scope of the invention. A flange 174 is located at the top of door 111, adjacent to hinges 170, 172a and 172b. Flange 174 extends partially over the top of electronics/optics compartment 102 when door 111 is in the open position. Flange 174 prevents moisture (e.g., rain) from entering compartment 102 when door 111 is open.

Drop terminal compartment door 112, which includes hinges 171, 173a and 173b, flange 175 and locking mechanism 181, is substantially identical to electronics/optics door 111. Door 112 rotates about frame hinges 171, 173a and 173b. In a particular embodiment, locking mechanism 181 includes one or more security washers which retain door 112 in the closed position. The security washer configuration can be incorporated into the structure of door 112. Again, other locking mechanisms are possible and considered within the scope of the invention. Locking mechanisms 180 and 181 for respective doors 111 and 112 are typically different because different craftspersons require access to compartments 102 and 103. Separate doors 111 and 112 advantageously allow the craftspersons to access to the desired compartment 102 or 103, without unnecessarily exposing the elements in the other compartment.

Solar panel 184 is mounted on the top of frame 101. Solar panel 184 includes two solar shade structures 182 and 183 which are positioned above frame 101. Solar shade structures 182 and 183 absorb radiant heat from the sun and dissipate the bulk of this heat to the ambient air external to the ONU enclosure 100, rather than conducting this heat to frame 101. This heat dissipation occurs because the solar panel 184 has a relatively small area of contact with frame 101. Solar panel 184 thereby effectively reduces the temperature of frame 101, and consequently temperature of compartments 102 and 103. As a result, a degree of protection is provided for heat sensitive elements housed within frame 101. In an alternative embodiment, a thermally insulative material can be located between solar panel 184 and frame 101 to improve the operation of solar panel 184.

Mounting brackets 140 and 141 allow ONU enclosure 100 to be horizontally mounted on a pedestal or on a strand. Mounting brackets 140–141 are designed to clamp onto a rod or cable by simply tightening nuts 140a and 141a using a 216C wrench, which is a standard tool for a craftsman mounting ONU enclosure 100. The mounting of ONU enclosure 100 is described in more detail below.

FIGS. 3 and 4 illustrate certain exterior measurements of ONU enclosure 100 in accordance with one embodiment of the invention. The overall length of enclosure 100 along the Y-axis ($Y_1$) ,as determined by the length of doors 111 and 112, is 26.24 inches (FIG. 3). The overall width of enclosure 100 along the X-axis ($X_1$), as determined by the width of doors 111 and 112, is 12.00 inches (FIG. 3). The overall height of enclosure 100 along the Z-axis ($Z_1$), as determined by the height of doors 111 and 112, is 13.82 inches (FIG. 4). As described in more detail below, ONU enclosure 100 provides the functionality of broadband ONU as well as a drop terminal closure. As such, ONU enclosure 100 is a relatively compact structure. In another embodiment, ONU enclosure 100 is modified to include half the number of coaxial cable connectors, half the number of VF pairs and half the number of power pairs. Such a modified ONU enclosure has a reduced footprint.

Figure 5:
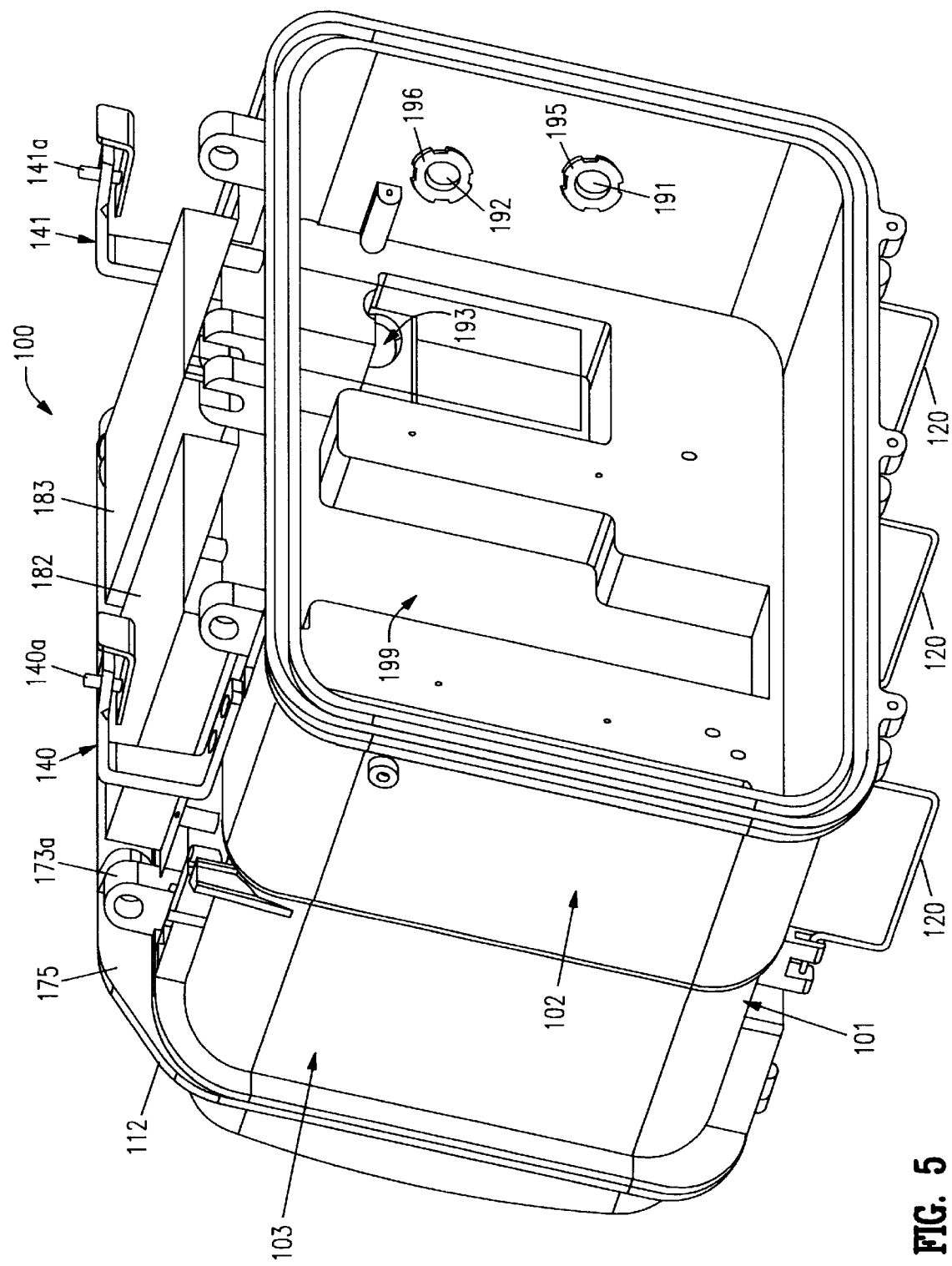
FIGS. 5 and 6 are isometric views of the electronics/optics compartment of the ONU enclosure of FIGS. 1 and 2.

FIG. 5 is an isometric view of ONU enclosure 100 with door 111 removed. FIG. 5 illustrates partition 199 which separates compartments 102 and 103. An opening 193 is located in partition 199. As described in more detail below, twisted pair conductors (VF and power) are routed through opening 193.

Fiber cable opening 191 and power cable opening 192, which extend through compartment 102 of frame 101, open to respective routing structures 116 and 115 at the exterior of frame 101. Openings 191 and 192 allow the optical fiber and power supply lines, respectively, to enter the electronics/optics compartment 102 of enclosure 100. Openings 191 and 192 incorporate respective two-part cable entry seals 195 and 196, which are commonly available from Sigmaform Inc. as part no. CES-2 or Raychem Corp. as part no. 20W223-3. Each of these entry seals 195–196 forms a water-tight seal to the electronics/optics compartment 102 using an O-ring (not shown). The optical fiber cable which extends through fiber cable opening 191 and the power cable which extends through the power cable opening 192 each have a corresponding surrounding cable jacket. Each of these cable jackets is sealed to a corresponding cable entry seal 195–196 by heat shrink tubing which surrounds the cable jacket. The inner surface of the heat shrink tubing includes a hot melt adhesive which forms a bond to the cable jacket. In another embodiment, the previously described cable entry seals are replaced with a tubular protrusions located in openings 191–192. These protrusions can be formed integral with frame 101 or joined to frame 101 with an adhesive.

Optional routing structures 115 and 116 (FIG. 1) allow for horizontal pedestal deployment where the length of the pedestal is to be minimized. Routing structures 115 and 116 are designed such that the received optical fiber does not bend past a minimum bend radius when entering electronics/optics compartment 102. Heat shrink tubing is located inside the entire length of routing structures 115 and 116, and surrounds the cable jackets of the cables located therein.

In the foregoing manner, a water-tight seal is formed to prevent moisture from entering electronics/optics compartment 102 through the fiber cable opening 191 or the power cable opening 192.

Returning to FIG. 1, plugged opening 117 in drop terminal compartment 103 is dimensioned to receive a jacketed cable having a plurality of bundled voice frequency (VF) twisted conductor pairs and power conductor pairs. In one embodiment, opening 117 is sized to receive a bundled cable having fifty twisted pair conductors, thirty-two of which are typically used. Opening 117 remains plugged if a bundled cable is not used. The use (or non-use) of opening 117 is described in more detail below in connection with the discussion of drop terminal compartment 103.

Coaxial cable retaining slots 121a–121d and VF/power drop cable retaining slots 122a–122i are located on the bottom surface of enclosure 100 (FIG. 2). Each of coaxial cable retaining slots 121a–121d and drop cable retaining slots 122a–122i is designed to receive a corresponding grommet. Each coaxial cable grommet slides into and out of its corresponding slot and retains up to four coaxial cables (not shown), for a total of sixteen coaxial cables. Similarly, each drop pair grommet slides into its corresponding slot and retains up to three drop cables. As described in more detail below, coaxial cables and VF or power drop cables are routed from drop terminal compartment 103 through slots 121a–121d and 122a–122i (and their corresponding grommets), and are threaded through cable guides 120 and routed toward the end of frame 101 which includes openings 191 and 192. In this manner, all cables and connectors routed to enclosure 100 advantageously enter/exit enclosure 100 from the same end of enclosure 100. This end of ONU enclosure 100 will hereinafter be referred to as the first end of enclosure 100.

Figure 6:
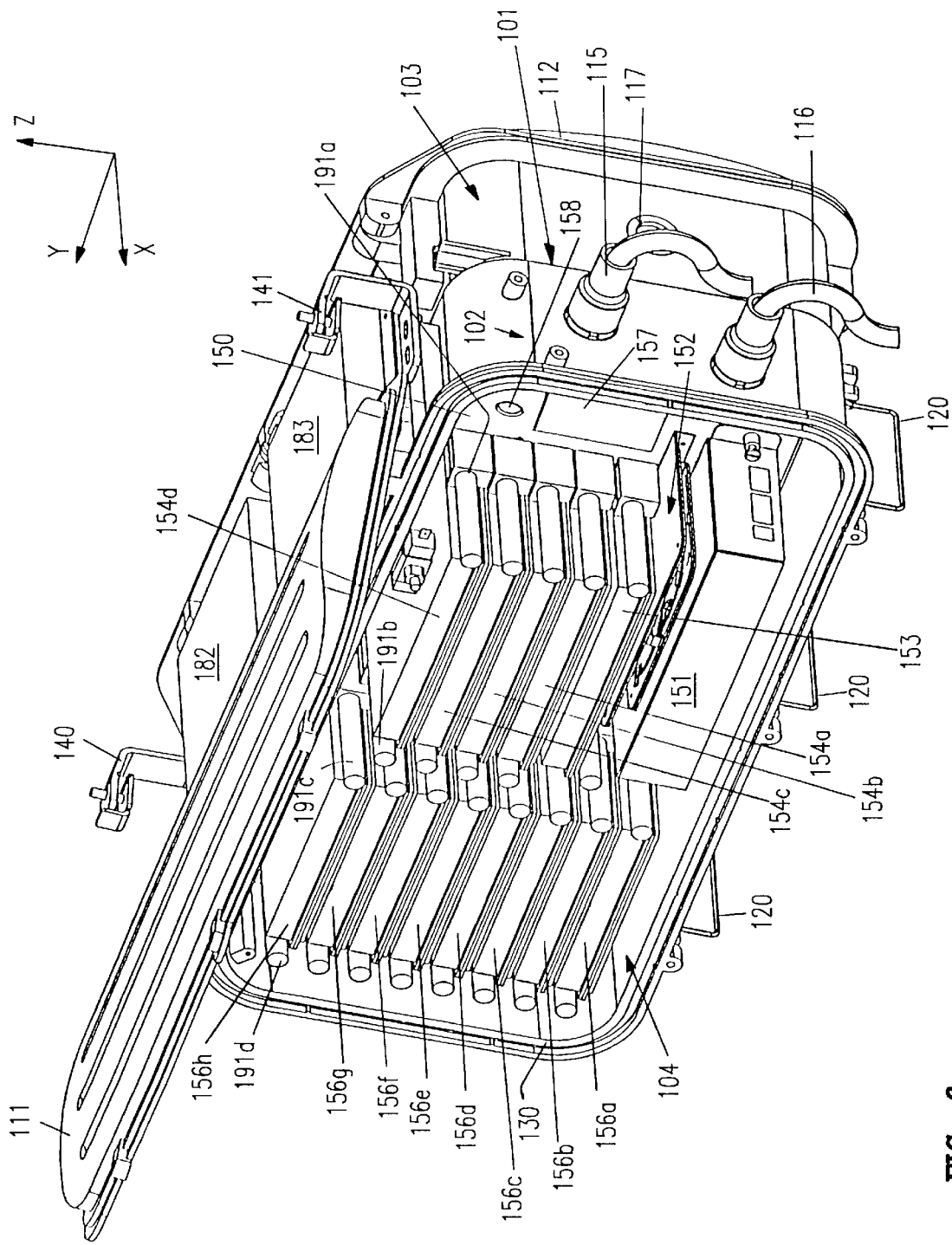

The components housed within ONU enclosure 100 will now be described. FIG. 6 is an isometric view of electronics/optics compartment 102 with door 111 held in the open position, thereby exposing electronics/optics compartment opening 104. An elastomeric O-ring 130 is located about the perimeter of opening 104 in a groove. When door 111 is locked, a water-tight seal is formed between door 111 and O-ring 130. As a result, the various elements located in electronics/optics compartment 102 are protected from moisture and other ambient conditions when door 111 is closed.

Figure 8:
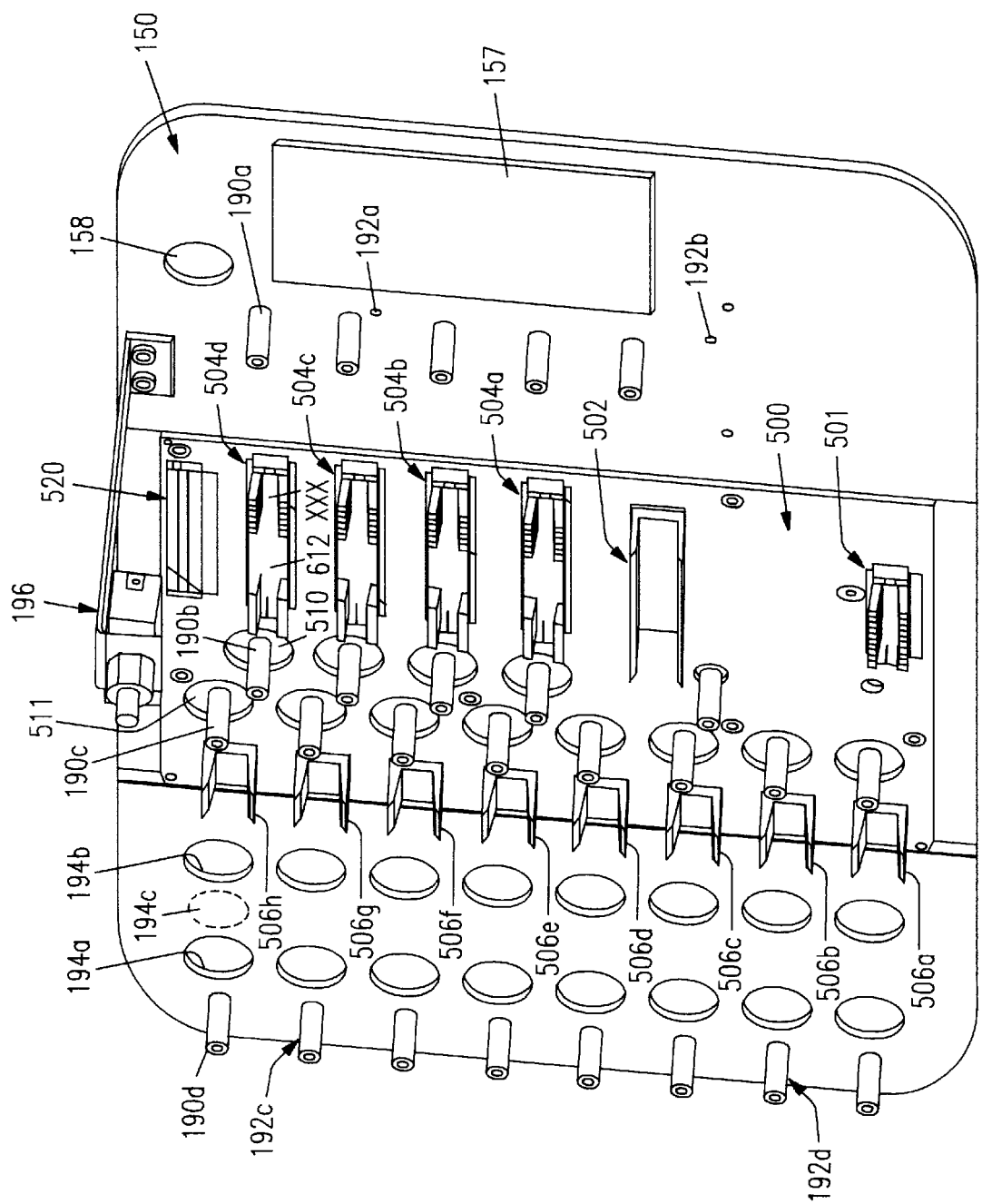
FIG. 8 is an isometric view of a support plate and printed circuit board which is mounted within the electronics/optics compartment of FIG. 6 in accordance with one embodiment of the invention.

Electronics/optics compartment 102 houses electronics/optics support plate 150, power supply 151, fiber storage tray 152, controller unit 153, telephony interface units 154a–154d, broadband interface units 156a–156h, and power protection board 157. A printed circuit board (PCE) 500, which is not visible in FIG. 6, is mounted on support plate 150 under power supply 151, fiber storage tray 152, controller unit 153, telephony interface units 154a–154d and broadband interface units 156a–156h. PCB 500, which is described in more detail below in connection with FIG. 8, provides electrical connections between the previously listed electronics/optics devices.

Support plate 150 can be made, for example, of a metal, a metal alloy, or a plastic. In a particular embodiment, support plate 150 is made of an aluminum alloy having a relatively high thermal conductivity. Support plate 150 thereby provides a thermally conductive path for the dissipation of heat generated by circuitry in the electronics/optics compartment 102. Heat is conducted from the various cartridges to support plate 150 and partition 199. Support plate 150 also provides a mechanically rigid structure which supports and retains power supply 151, fiber storage tray 152, controller unit 153, telephony interface units 154a–154d, broadband interface units 156a–156h, power protection circuit board 157, and PCB 500. In addition, as described in more detail below, support plate 150 includes connector rods which facilitate the blind mating of units 153, 154a–154d and 156a–156h to PCB 500.

As previously described, electronics/optics compartment 102 of ONU enclosure 100 receives a power supply cable (not shown) through corresponding power cable opening 192 and a cabled optical fiber (not shown) through corresponding fiber cable opening 191. In one embodiment, the power supply cable includes six pairs of 22-gauge twisted pair conductors which provide a supply voltage of approximately –130 volts DC. The power supply cable, which is typically 20 feet long, is connected to power protection board 157. Power supply conductors are routed from power protection board 157 into power supply 151. Twisted pair power conductors are routed from power protection board 157, through an opening 158 in support plate 150, and through opening 193 (FIG. 5) in partition 199. Power protection board 157 provides lightning protection and filtering functions which are known to one skilled in the communication arts.

Power supply module 151 provides the power necessary to operate controller unit 153, telephony interface units 154a–154d and broadband interface units 156a–156h through the backplane of PCB 500. The circuitry included within power supply module 151 is known to those skilled in the communication arts.

As previously described, electronics/optics compartment 102 also receives a cabled optical fiber (not shown) from fiber cable opening 191 in compartment 102. A factory-installed length of optical fiber (typically 20 feet) is routed into ONU enclosure 100. External to ONU enclosure 100, both the power and fiber cables are spliced in a craft-familiar splice closure such as Raychem Corp.'s AIRFOSC™ closure, thereby providing a craft-familiar connection to network power and signals which are transmitted to and from a host digital terminal (HDT) in a central office. Within enclosure 100, the optical fiber is routed to fiber storage tray 152. Fiber storage tray 152 receives and routes the optical fiber in a manner which ensures that the optical fiber does not bend past its minimum bend radius. The function and general design of fiber storage tray 152 is known to those skilled in the communications arts.

The optical fiber is routed from fiber storage tray 152 to controller unit 153 such that the minimum bend radius requirement of the optical fiber is not violated. Controller unit 153 includes a receiver which converts the optical signals received on the fiber into electrical signals. These electrical signals are transmitted from controller unit 153 to PCB 500. PCB 500 routes the electrical signals between controller unit 153 and telephony interface units 154a–154d and broadband interface units 156a–156h.

Controller unit 153 also includes a laser which operates in response to electrical signals received from telephony interface units 154a–154d and broadband interface units 156a–156h. This laser generates optical signals in response to the received electrical signals. These optical signals are transmitted from controller unit 153 to the HDT in the central office on the optical fiber. In this manner, bi-directional communication is enabled between telephony interface units 154a–154d and broadband interface units 156a–156h in ONU enclosure 100 and the central office. The function and general design of controller unit 153 is known to those skilled in the communications arts.

FIG. 7a is an isometric view of broadband interface unit 156h, which includes a cartridge 501 having captive screw elements 502a–502b, flanges 503a–503b, connector rod receiving openings 504 and 505, coaxial cable connector openings 506 and 507, electronic connector opening 508, coaxial cable connector 510 and 511, electronic connector 512 and thermal contacts 515 and 516. Flanges 503a and 503b extend laterally from cartridge 501 and retain captive screw elements 502a and 502b, respectively. Screw elements 502a and 502b include threaded members (not shown) which extend through openings 504 and 505, respectively. These threaded members are rotated when the captive screw elements 502a and 502b are rotated, thereby allowing these threaded members to engage with internally threaded connector rods. These connector rods are described in more detail below in connection with FIG. 7.

Coaxial cable connector elements 510 and 511 provide connections to coaxial cable bulkhead connectors which are located on partition 199. These bulkhead connectors are described in more detail below. Electronics connector element 512 is adapted to connect to a mating connector element on PCB 500. As described in more detail below, the locations of connector rod openings 504–505, coaxial cable connectors 510–511 and electronics connector 512 are selected to align with corresponding elements on support plate 150 and partition 199.

Cartridge 501 houses broadband interface circuitry known to those skilled in the communications arts. The cartridges are typically made of a thermally conductive material such as aluminum. The circuitry within cartridge 501 is located on one or more printed circuit boards (not shown) which are mechanically coupled to cartridge 501. Thermal contact 516 extends away from cartridge 510 and provides a good thermal connection to support plate 150. Optional thermal contact 515 extends away from cartridge 510 and through a corresponding opening (not shown) in support plate 150 to contact partition 199, thereby providing a good thermal connection to partition 199. In an alternative embodiment, thermal contact 515 and its corresponding opening in support plate 150 is eliminated, thereby allowing face surface 517 of cassette 501 to make a good thermal connection to support plate 150. As a result, heat generated by broadband interface unit 156*h* can be conducted away from cartridge 501 to support plate 150 (and partition 199). Cartridge 501 also provides a shield for radio frequency (RF), electromagnetic and other signal-based interference and susceptibility.

Figure 7B:
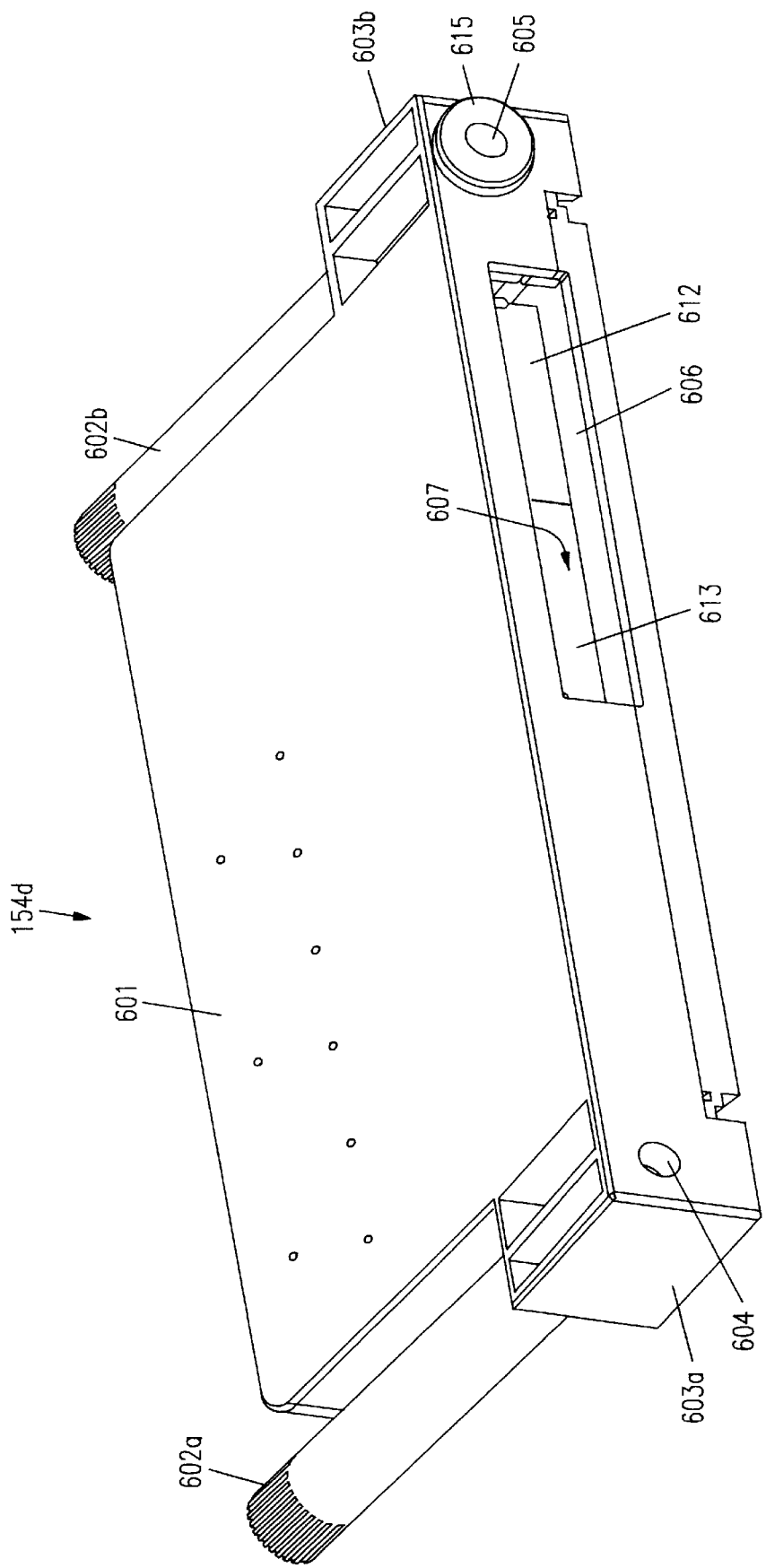

FIG. 7*b* is an isometric drawing of telephone interface unit 154*d* which includes a cartridge 601 having captive screw elements 602*a*–602*b*, flanges 603*a*–603*b*, connector rod receiving openings 604 and 605, VF connector opening 606, VF connector 607 and thermal contact 616. Flanges 603*a*–603*b*, captive screw elements 602*a*–602*b* and thermal contact 615 are substantially similar to elements previously described in connection with broadband interface unit 156*h* (FIG. 7*a*).

Cartridge 601 houses telephone interface circuitry known to those skilled in the communications arts. VF connector 607 facilitates the electrical connection of telephone interface circuit 154*d* to PCB 500. As described in more detail below, the locations of connector rod openings 604–605 and VF connector 607 are selected to align with corresponding elements on support plate 150 and partition 199. VF connector 607 is partitioned into two portions 612 and 613. Connector portion 612 is adapted to provide connections to incoming signals received from the network via PCB 500. Connector portion 613 is adapted to provide connections for outgoing signals to the subscribers.

FIG. 8 is an isometric view which illustrates support plate 150 and PCB 500. Support plate 150 is connected to partition 199 (FIG. 5) by fasteners such as screws or rivets inserted through openings 192*a*–192*d* in support plate 150. PCB 500, which includes power supply connector element 501, controller unit connector element 502, telephone interface connector elements 504*a*–504*d*, broadband interface unit connector elements 506*a*–506*h* and VF connector element 520, is connected to support plate 150 as illustrated.

Support plate 150 includes a plurality of internally threaded connector rods, such as connector rods 190*a*–190*d*. Connector rod openings, such as openings 510 and 511, are formed through PCB 500 to expose connector rods 190*b* and 190*c*. These connector rod openings also expose portions of the surface of support plate 150. Support plate 150 additionally includes sixteen coaxial bulkhead connector openings, including openings 194*a* and 194*b*. Each of these sixteen coaxial connector openings receives a corresponding f-type coaxial cable bulkhead connector (not shown) which is located on partition 199. Each coaxial cable bulkhead connector extends through partition 199, thereby providing an electrical pathway between electronics/optics compartment 102 and drop terminal compartment 103.

Each coaxial cable bulkhead connector includes a watertight seal which prevents moisture from passing between compartments 102 and 103. The leakage path past the threads of each bulkhead connector is sealed either by a thread sealing compound or an O-ring. When the connector is unterminated, the center conductor/dielectric leakage path is sealed by threading a cap having a gasket onto the connector. When the connector is terminated, the mating connector seals to the coaxial cable connector.

Broadband interface unit 156*h* (FIG. 7*a*) attaches to support plate 150 and PCB 500 as follows. Connector rod openings 504 and 505 are positioned on connector rods 190*c* and 190*d*, respectively. Connector rods 190*c* and 190*d* are sufficiently tall to enable blind registration of broadband interface unit 156*h* before electronic connector element 512 of unit 156*h* comes into mechanical or electrical engagement with the mating connector element 506*h* of PCB 500, and before coaxial cable connectors 510 and 511 of unit 156*h* come into mechanical or electrical engagement with the coaxial cable bulkhead connectors located on partition 199. The outside surfaces of connector rods 190*c* and 190*d*, which provide registration of cartridges 501, are shown in this embodiment as having a circular section, but could have other geometries which would provide registration when engaged in a mating cavity in the cartridge.

Broadband interface unit 156*h* is pushed toward support plate 500 until coaxial connector elements 510 and 511 come into contact with the corresponding coaxial cable bulkhead connectors, and connector element 512 comes into contact with mating connector element 506*h*. Screw elements 502*a* and 502*b* are then tightened into the internal threads of connector rods 190*c* and 190*d*, thereby holding broadband interface unit 156*h* on support plate 150. Screw elements 502*a* and 502*b* are typically manipulated by hand. The mating of connector elements 506*h* and 512 provides electrical connections between the circuitry of broadband interface unit 156*h* and PCB 500.

Thermal extension 516 on unit 156*h* is held in good physical contact with support plate 150, thereby allowing heat to be conducted from unit 156*h* to support plate 150 (and partition 199). Thermal extension 516 contacts support plate 150 through connector rod opening 511. For the support plate 150 illustrated in FIG. 8, thermal extension 515 (FIG. 7*a*) of unit 156*h* would not be used. Thus, face surface 517 of unit 156*h* would be held in good physical (and thermal) contact with support plate 150. Alternatively, support plate 150 can include an opening located at the position indicated by dashed line 194*c* (FIG. 8). In such an alternative, thermal extension 515 is provided on unit 156*h*. Thermal extension 515 extends through this opening at 194*c* to form a good physical (and thermal) contact with partition 199.

Telephone interface unit 154*d* (FIG. 7*b*) attaches to support plate 150 and PCB 500 in a manner similar to that previously described for broadband interface unit 156*h*.

More specifically, connector rod openings 604 and 605 are positioned on connector rods 190a and 190b, respectively. Connector element 607 on unit 154d blind mates with connector element 504d on PCB 500, thereby connecting the circuitry in unit 154d to PCB 500. Controller unit 153 is connected to connector rods on support plate in a manner similar to that previously described in connection with broadband interface unit 156h and telephone interface unit 154d. Controller unit connector 502 on PCB 500 is blind-mated with a mating connector element (not shown) in controller unit 153 to provide an interface between controller unit 153 and PCB 500.

In the illustrated embodiment, support plate 150 does not provide connector rods for facilitating the connection of power supply module 151. An alternative embodiment would incorporate internally threaded connector rods and corresponding captive screws to connect power supply module 151 to support plate 150. Yet another embodiment would incorporate a pair of unthreaded connector rods to provide only the function of blind mating, while separate screws would be used to hold power supply module 151 to support plate 150.

Each of telephony interface units 154a–154d supports up to six VF conductor pairs. In this embodiment, PCB 500 provides electrical paths from telephony interface connector elements 504a–504d to electrical connector 520 on PCB 500. A twisted pair cable (not shown) which includes twenty-four VF twisted pairs is plugged into connector 520. This twisted pair cable is routed from connector 520, through opening 158 in support plate 150, through opening 193 (FIG. 5) in partition 199, and into drop terminal compartment 103. In addition, eight pairs of power twisted pairs, which provide power for remote electronics, are routed from power protection board 157 through openings 158 and 193, and into drop terminal compartment 103.

Figure 9:
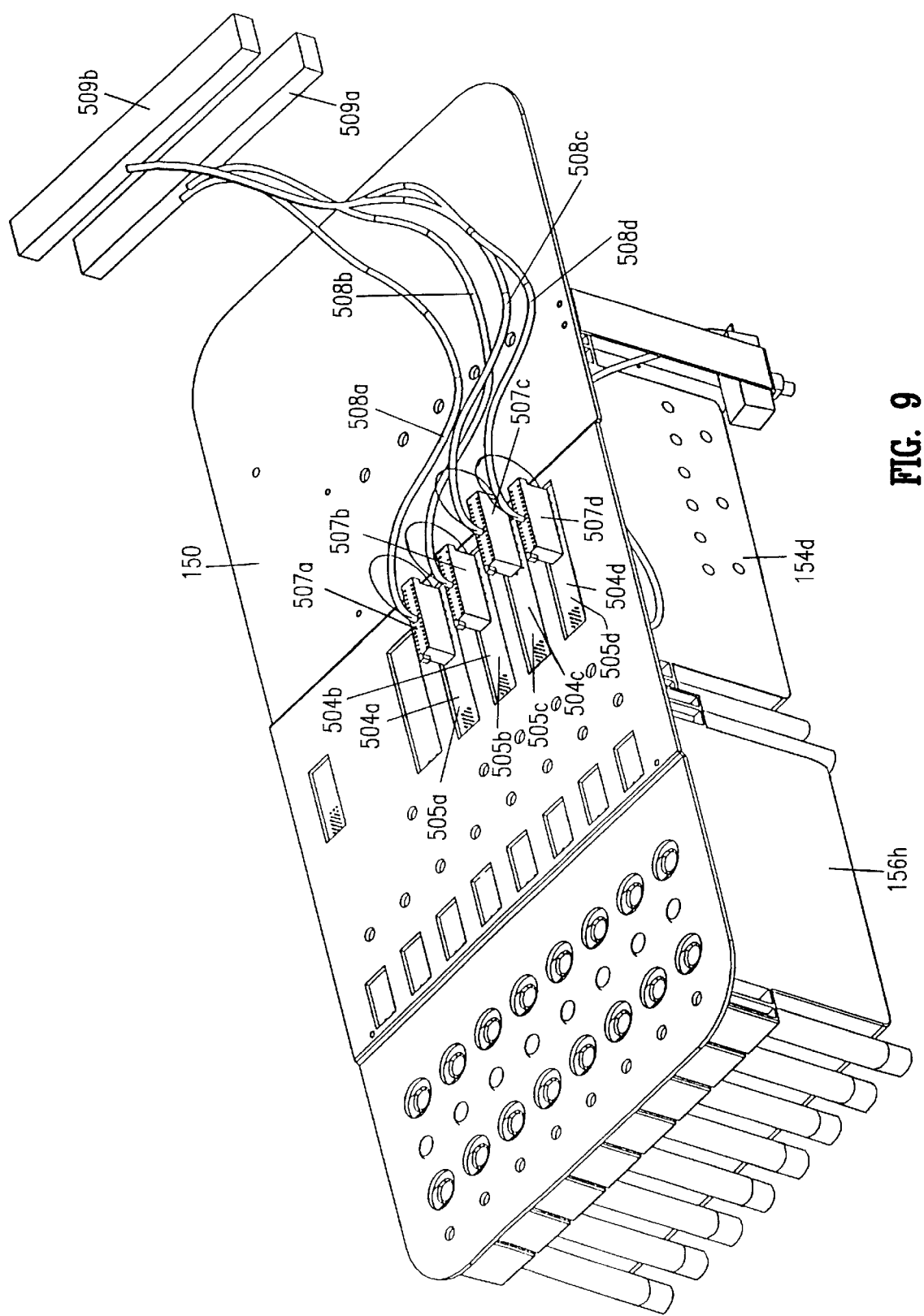
FIG. 9 is an isometric view of a support plate and printed circuit board in accordance with another embodiment of the invention.
Figure 10:
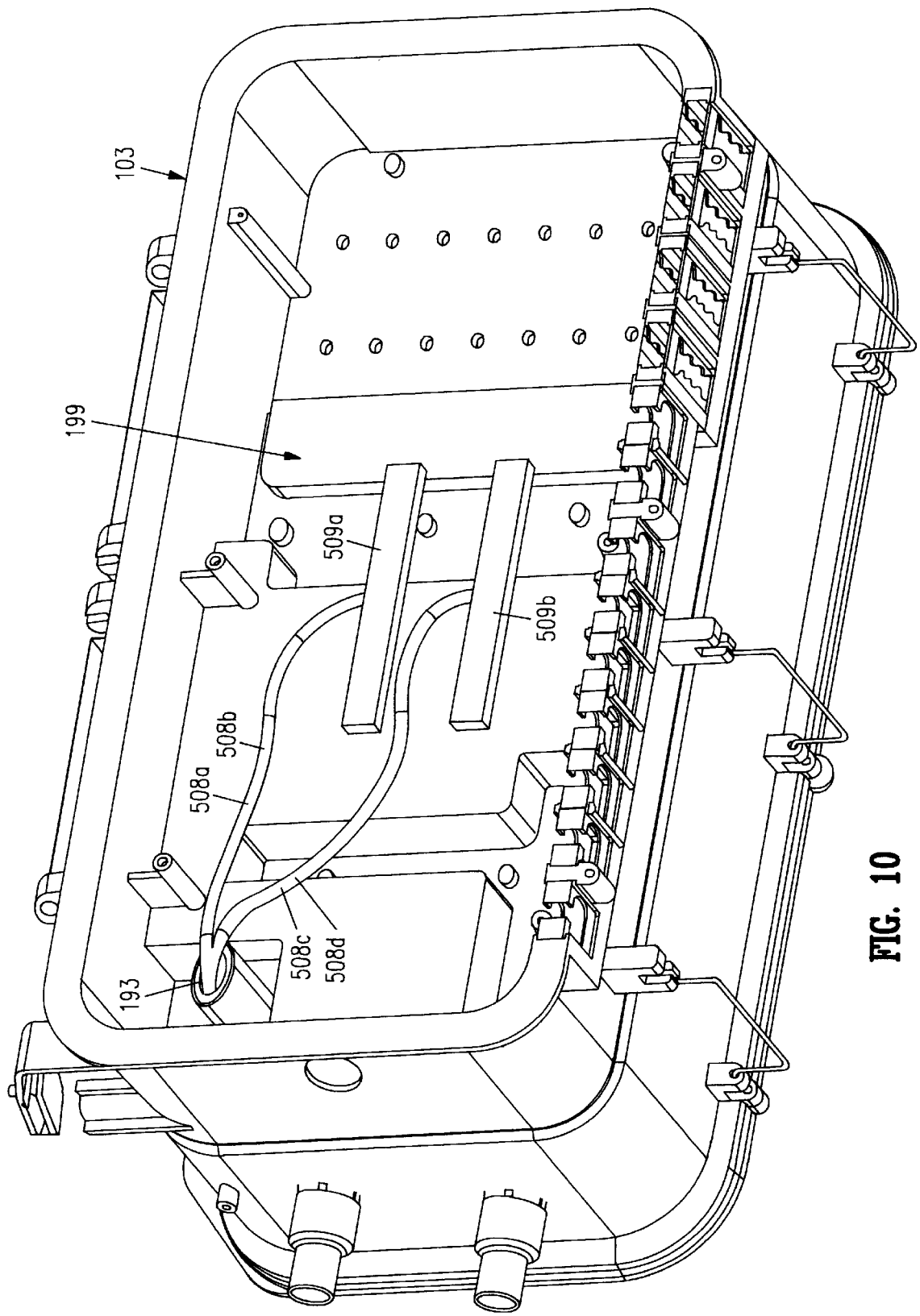
FIG. 10 is an isometric view of twisted pair conductors extending through an opening in a partition in the ONU enclosure of FIGS. 1 and 2.

FIGS. 9 and 10 illustrate an alternative embodiment, in which connector 520 is eliminated from PCB 500. In this embodiment, openings 505a–505d formed through support plate 150 enable connectors 507a–507d to mate with protruding pins of connector elements 504a–504d. These protruding pins extend through PCB 500 to provide direct electrical connections to the connector elements of telephone interface units 154a–154d which are typified by connector element 613 (FIG. 7b). As previously described in connection with FIG. 7b, connector element 613 provides for the transmission of outgoing VF signals to the subscribers. Each of connectors 507a–507d provide a connection to a corresponding group of six VF conductor pairs 508a–508d. These VF twisted pairs 508a–508d, in turn, are coupled to connector modules 509a and 509b. As illustrated in FIG. 10, the VF twisted pairs 508a–508d and connector modules 509a and 509b are routed through opening 193 (FIG. 5) in partition 199 and into drop terminal compartment 103. In this manner, the VF signals from telephony interface units 154a–154d are transmitted to drop terminal compartment 103 on twisted pair conductors. The power twisted pairs are routed into drop terminal compartment 103 in the manner previously described.

A water-tight seal is provided in opening 193 around the VF and power twisted pair conductors. In one embodiment, heat shrink tubing combined with hot melt adhesive forms the seal between opening 193 and these twisted pair conductors. In another embodiment, a potting compound combined with a damming cap forms the seal. As a result, moisture is prevented from passing from drop terminal compartment 103 to electronics/optics compartment 102 through opening 193.

Support plate 150 can be removed from electronics/optics compartment 102 and be used to support elements 151–153, 154a–154d and 156a–156h independently in a controlled environment where a primary enclosure is not required. Support plate 150 further maximizes design flexibility for future changes in the electronics and optics by minimizing the number of features provided by the hard-tooled (cast or molded) frame 101. The features of support plate 150 can be changed relatively easily (with respect to frame 101) to accommodate changes in the electronics and optics (or different electronics and optics.

In the event that frame 101 is constructed of a material that lacks structural integrity, support plate 150 performs the essential function of structurally locating and restraining all of the working electronics and optics. Support plate 150 further serves as a common structure which can be used in a frame 101 which is made of either of metal or plastic.

Figure 11:
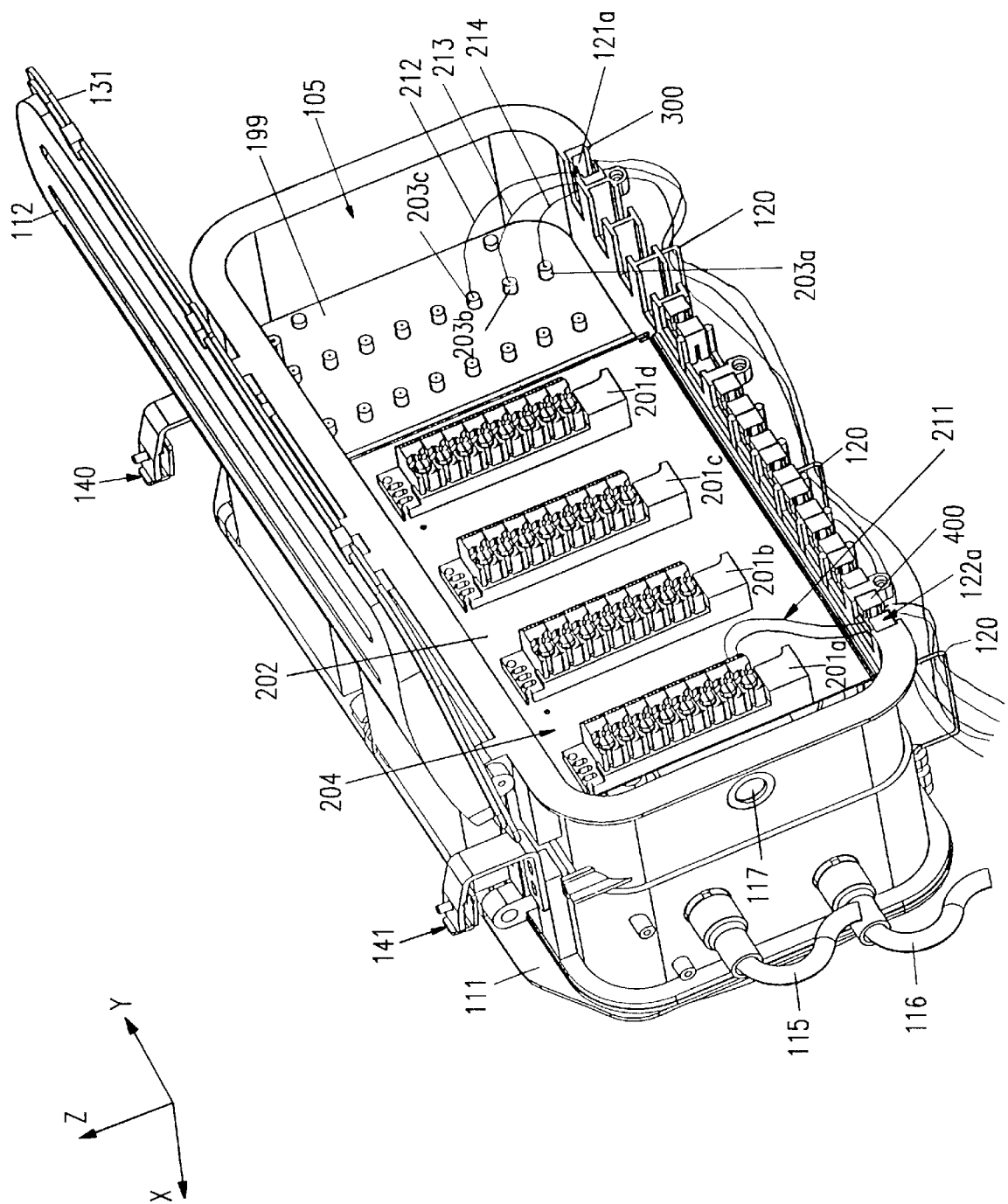
FIG. 11 is an isometric view of the drop terminal compartment of the ONU enclosure of FIGS. 1 and 2.

FIG. 11 is an isometric view of ONU enclosure 100 with door 112 held in the open position, thereby exposing drop terminal compartment opening 105. A gasket 131 is retained within a groove located around the perimeter of door 112. When door 112 is locked, gasket 131 contacts door 112 about the perimeter of opening 105. As a result, the various elements located in drop terminal compartment 103 are provided with substantial protection from ambient conditions when door 112 is closed.

Drop terminal compartment 103 provides for the connection of VF and power drop cables as well as coaxial cables within ONU enclosure 100. These drop cables typically run from ONU enclosure 100 to a customer's point of use, such as a house.

Drop terminal compartment 103 includes sixteen f-type coaxial cable bulkhead connectors, including connectors 203a, 203b and 203c, which are located on partition 199. As previously discussed, these sixteen coaxial cable bulkhead connectors extend through partition 199 to provide electrical connection with mating connectors on the broadband interface units 156a–156h located on the other side of partition 199 in electronics/optics compartment 102. As previously described, these connectors incorporate water-tight seals, such that moisture does not pass from compartment 103 to compartment 102. Coaxial drop cables 212, 213 and 214 are connected to respective connectors 203a, 203b and 203c within drop terminal compartment 103. Coaxial cables 212–214 are routed down through coaxial cable grommet 300, which is located and restrained in coaxial cable slot 121a, to the exterior of ONU enclosure 100. Coaxial cables 212–214 are further routed through cable guides 120 to the first end of ONU enclosure 100. Coaxial cables 212–214 are thereby advantageously routed in an organized manner.

Drop terminal compartment 103 further houses terminal block mounting plate 202, which is mounted on partition 199. In this embodiment, four terminal blocks 201a–201d are attached to mounting plate 202. Four openings (not shown), one per terminal block, extend through mounting plate 202 to expose conductors exiting the backside (i.e., network side) of terminal blocks 201a–201d. The connector modules which are coupled to the VF and power twisted pairs routed from electronics/optics compartment 102 through partition 199 are connected to the network side of terminal blocks 201a–201d. Terminal blocks 201a–201d are commonly available elements which provide gas tube lightning protection for twisted pair conductors. The connector modules used to connect the VF and power twisted pairs to terminal blocks 201a–201d can be, for example, commonly available Western Electric 710 modules or 3M Corp MS$^2$ modules. Because these connector modules are widely used in the industry, the craftsperson is enabled to field-install, provision, bridge and trouble-shoot the VF and power twisted pairs. Mounting plate 202 can be connected to partition 199 by a hinge along edge 204 of mounting plate 202. Such a hinged connection allows easy access to the network side of terminal blocks 201a–201d.

Subscriber VF or power drop cables, such as drop cable 211, are connected to the front side (i.e., subscriber side) of terminal blocks 201a–201d in a manner known in the art. Each drop cable is routed out of ONU enclosure 100 through one of VF/power drop cable slots 122a–122i and a corresponding drop cable grommet. For example, drop cable 211 is routed out of drop terminal compartment 103 through VF/power drop cable slot 122a and drop cable grommet 400. Drop cable 211 is further routed through cable guide 120 to the first end of ONU enclosure 100.

Different mounting plates 202 can be mounted within drop terminal compartment 103 to facilitate the use of different types of drop terminal blocks. Thus, frame 101 can advantageously be used with a variety of terminal blocks merely by changing out mounting plate 202.

If drop terminal blocks are to be provided external to ONU enclosure 100, then mounting plate 202 and terminal blocks 201a–201d can be removed from drop terminal compartment 103. In such an embodiment, the plug is removed from plugged opening 117, and a bundled twisted pair cable is connected directly to the connector module or modules within compartment 103. The bundled twisted pair cable is then routed out of compartment 103 through the unplugged opening 117 for connection with an external terminal block or blocks. A seal can be provided between the twisted pair cable and opening 117 to shield compartment 103 from the ambient conditions.

In a variation of this embodiment, drop terminal blocks 201a–201d are provided within drop terminal compartment 103, and selected twisted pairs of the bundled twisted pair conductor are connected to the subscriber side of selected drop terminal blocks 201a–201d and routed out to a customers point of use (or an external terminal block) through unplugged opening 117.

In yet another embodiment, drop terminal blocks 201a–201d are included within compartment 103, the plug is removed from opening 117, and an external bundled twisted pair cable is routed into compartment 103 through unplugged opening 117. In this embodiment, the bundled twisted pair cable is connected to receive signals from the network. The bundled twisted pair cable is routed behind mounting plate 202 and connected to the network side of drop terminal blocks 201a–201d. VF or power drop cables are connected to the subscriber side of terminal blocks 201a–201d and routed out of compartment 103 through slots 122a–122i to a customer's point of use as previously described. In this embodiment, the bundled twisted pair cable is not connected to the electronics and optics elements in electronics/optics compartment 102. However, other twisted pair conductors may or may not be routed from electronics/optics compartment 102 into drop terminal compartment 103. In this embodiment, terminal blocks 201a–201d advantageously provide lightning protection to the bundled twisted pair cable and the corresponding twisted pair drop cables.

Figure 12:
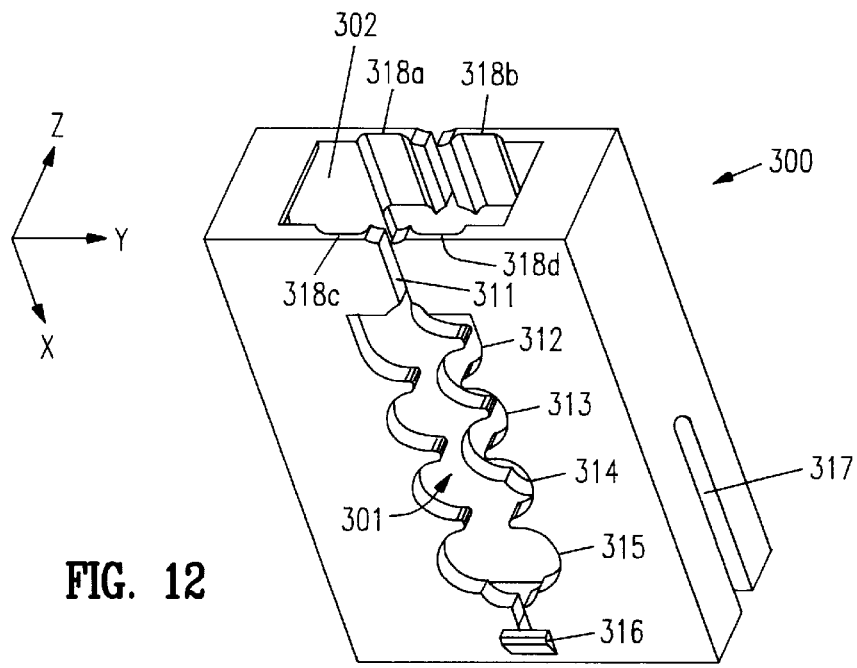
FIG. 12 is an isometric view of a coaxial cable grommet in accordance with one embodiment of the invention.
Figure 13A:
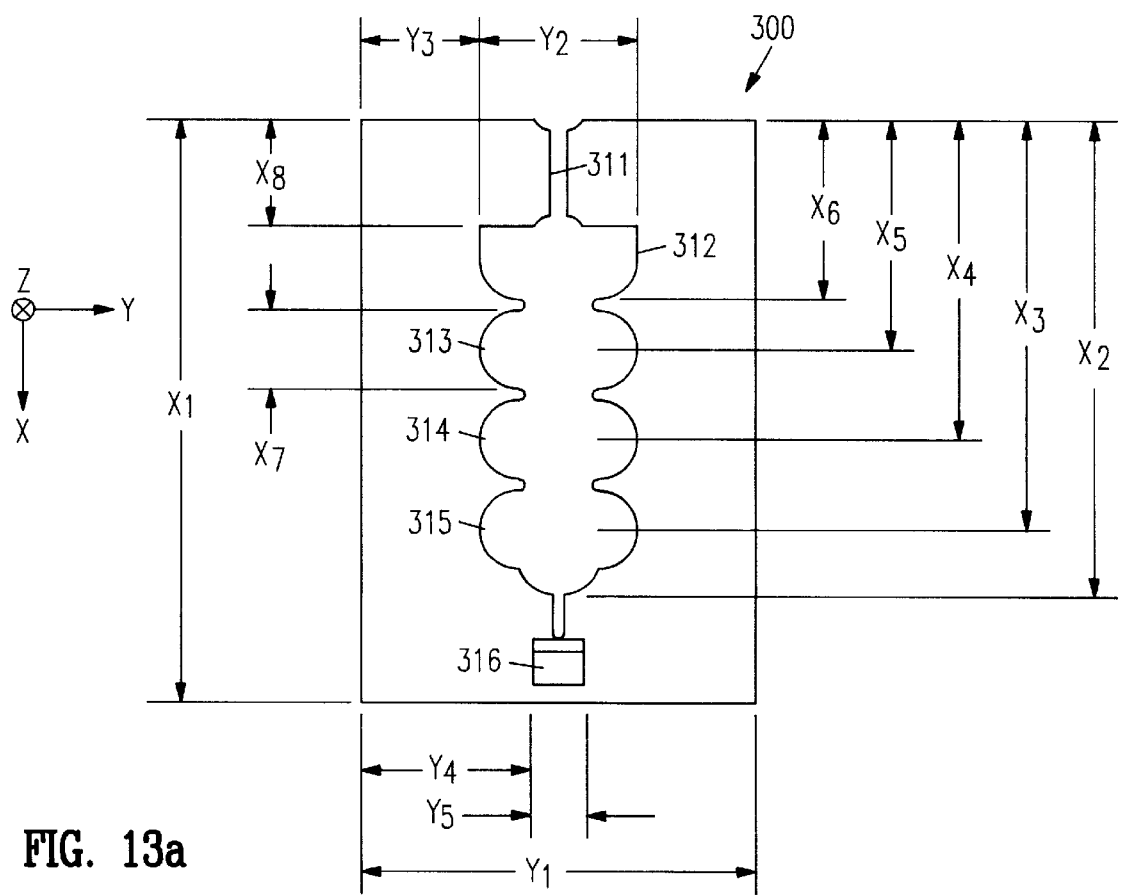
FIGS. 13a, 13b, 13c and 13d are front, side, bottom and top views of the coaxial cable grommet of FIG. 12.
Figure 13B:
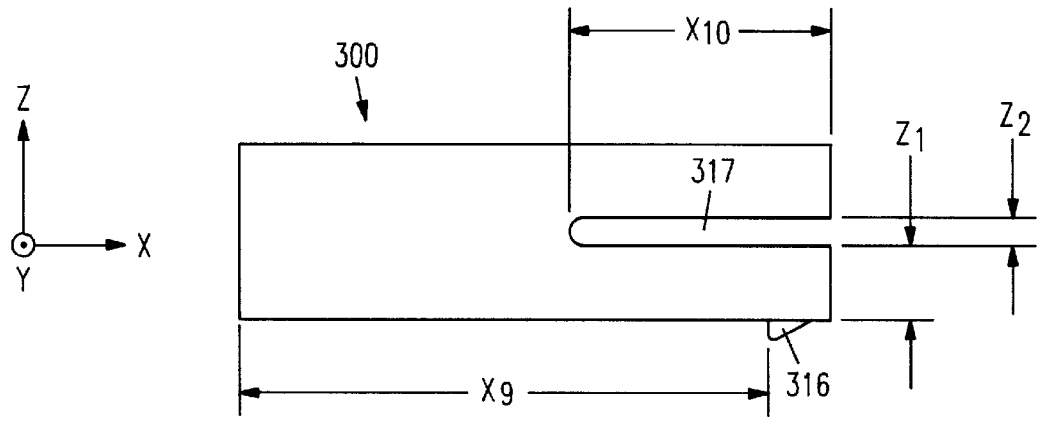
Figure 13C:
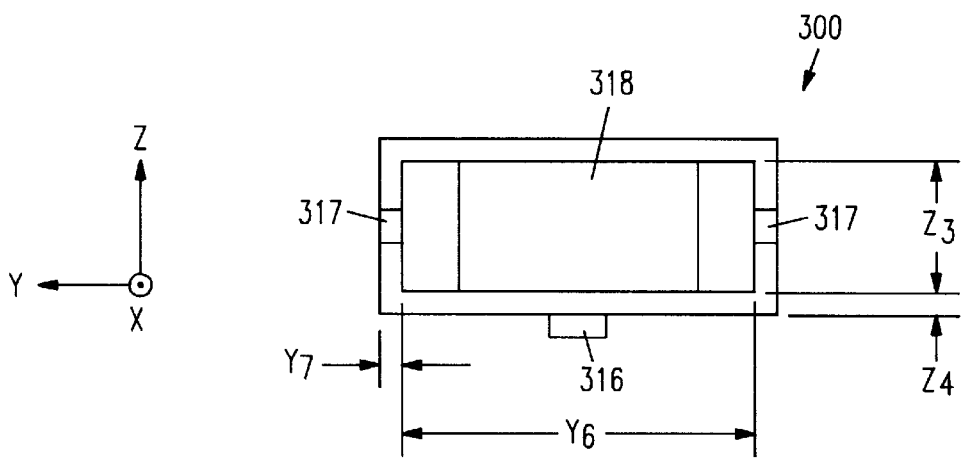
Figure 13D:
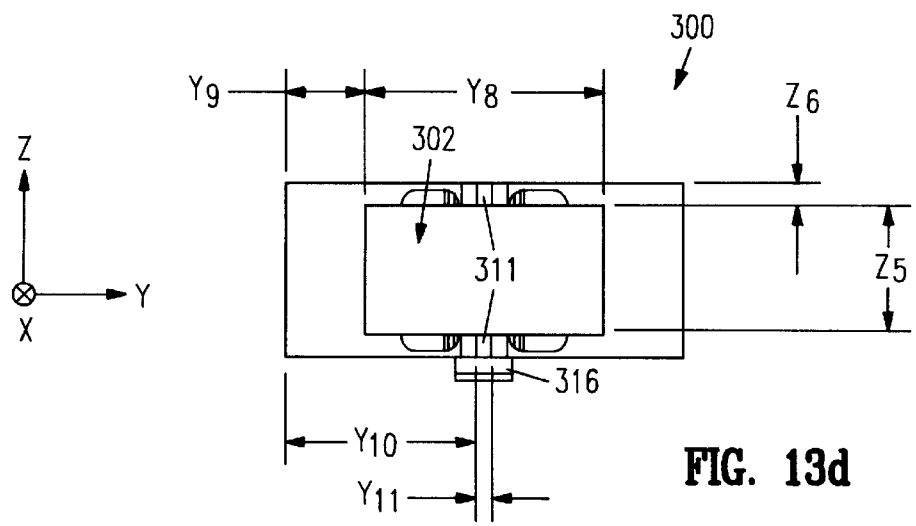
Figure 14:
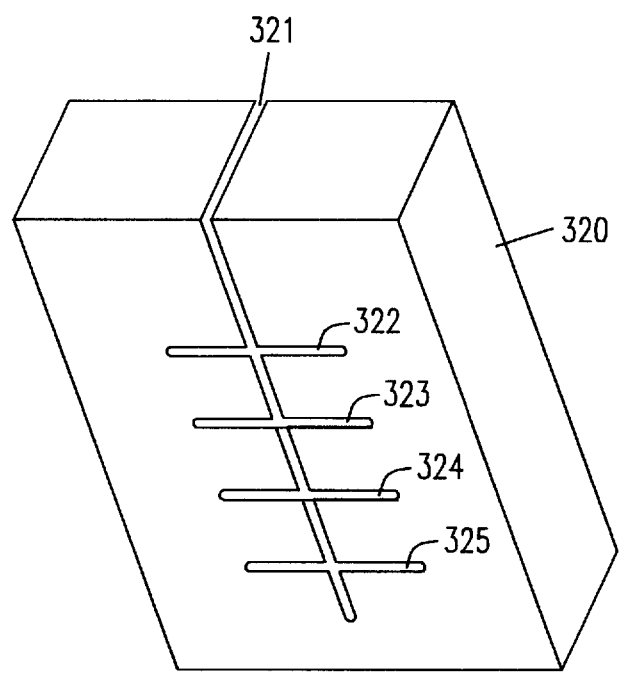
FIG. 14 is an isometric view of an elastomeric filler which is inserted into the coaxial cable grommet of FIG. 12 in accordance with one embodiment of the invention.

FIG. 12 is an isometric view of coaxial cable grommet 300 in accordance with one embodiment of the invention. FIGS. 13a, 13b, 13c and 13d are respective front, side, bottom and top views of grommet 300. FIG. 14 is an isometric view of a compliant grommet filler element 320 for use with grommet 300.

Grommet 300 includes a grooved slot 301 having a receiving channel 311 and four grooves 312–315 for receiving four corresponding coaxial cables. Receiving channel 311 is defined by four surrounding doors 318a–318d. Each of grooves 312–315 retains a corresponding coaxial cable. Doors 318a–318d, which surround opening 302 at the top end of grommet 300, are compliant to allow the coaxial cables to be driven through narrow receiving channel 311. A tab 316 is located at the bottom of grommet 300. Tab 316 engages with a corresponding tab opening in frame 103 (See, e.g., tab opening 123a in FIG. 2) to help retain grommet 300 in a corresponding one of coaxial cable slots 121a–121d.

Compliant grommet filler member 320 (FIG. 14), which in one embodiment is a closed cell foam elastomer such as EPDM is inserted into grommet 300 through opening 318 in the bottom end of grommet 300. This compliant grommet filler member includes a slit 321 which extends in the direction of grooved slot 301, and four slits 322–325 which extend perpendicular to slot 301. Compliant grommet member 320 closely surrounds the coaxial cables inserted into grommet 300. Longitudinal slots 317 allow the bottom end of grommet 300 to be compressed for improved insertion into coaxial cable slots 121a–121c. The dimensions of grommet 300 in accordance with one embodiment of the invention are listed in Table 1. In another embodiment, the compliant grommet filler is a molded elastomer.

TABLE 1

| | |
|---|---|
| $X_1$ = 2.240 inches | $Y_1$ = 1.480 inches |
| $X_2$ = 1.844 inches | $Y_2$ = 0.580 inches |
| $X_3$ = 1.600 inches | $Y_3$ = 0.450 inches |
| $X_4$ = 1.250 inches | $Y_4$ = 0.640 inches |
| $X_5$ = 0.900 inches | $Y_5$ = 0.200 inches |
| $X_6$ = 0.700 inches | $Y_6$ = 1.320 inches |
| $X_7$ = 0.300 inches | $Y_7$ = 0.080 inches |
| $X_8$ = 0.400 inches | $Y_8$ = 0.880 inches |
| $X_9$ = 2.000 inches | $Y_9$ = 0.300 inches |
| $X_{10}$ = 1.000 inches | $Y_{10}$ = 0.715 inches |
| | $Y_{11}$ = 0.050 inches |
| $Z_1$ = 0.280 inches | |
| $Z_2$ = 0.100 inches | |
| $Z_3$ = 0.500 inches | |
| $Z_4$ = 0.080 inches | |
| $Z_5$ = 0.500 inches | |
| $Z_6$ = 0.080 inches | |

Coaxial cable grommet 300 holds up to four coaxial cables. In this embodiment, grommet 300 is slid into its corresponding slot 121a–121d prior to installation. Each coaxial cable is driven past the four doors 318a–318d of grommet 300. Doors 318a–318d flex laterally to permit entry of the coaxial cable into receiving channel 311 and into one of corresponding grooves 312–315. At this point, the compliant grommet filler member 320 closely surrounds the coaxial cable, and the four doors 318a–318d prevent the coaxial cable, which is relatively rigid, from springing out of grommet 300. Slack can be introduced or removed from the coaxial cable before or after the cable has been inserted into grommet 300 by axially displacing the coaxial cable relative to the grommet. Slack allows the ends of the coaxial cables to reach corresponding coaxial cable bulkhead connectors located on partition 199 within drop terminal compartment 103. The coaxial cable is removed from grommet 300 by pulling the cable past doors 318a–318d. In another embodiment, the coaxial cables are driven into grommet 300 before grommet 300 is inserted into a corresponding slot 121a–121d. Grommet 300 is then inserted into a corresponding one of slots 121a–121d.

Figure 15:
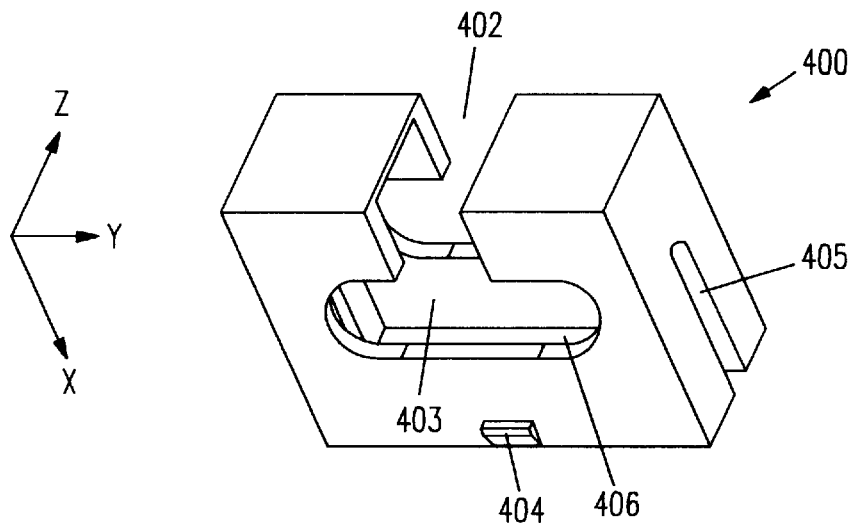
FIG. 15 is an isometric view of a VF drop cable grommet in accordance with one embodiment of the invention.
Figure 16A:
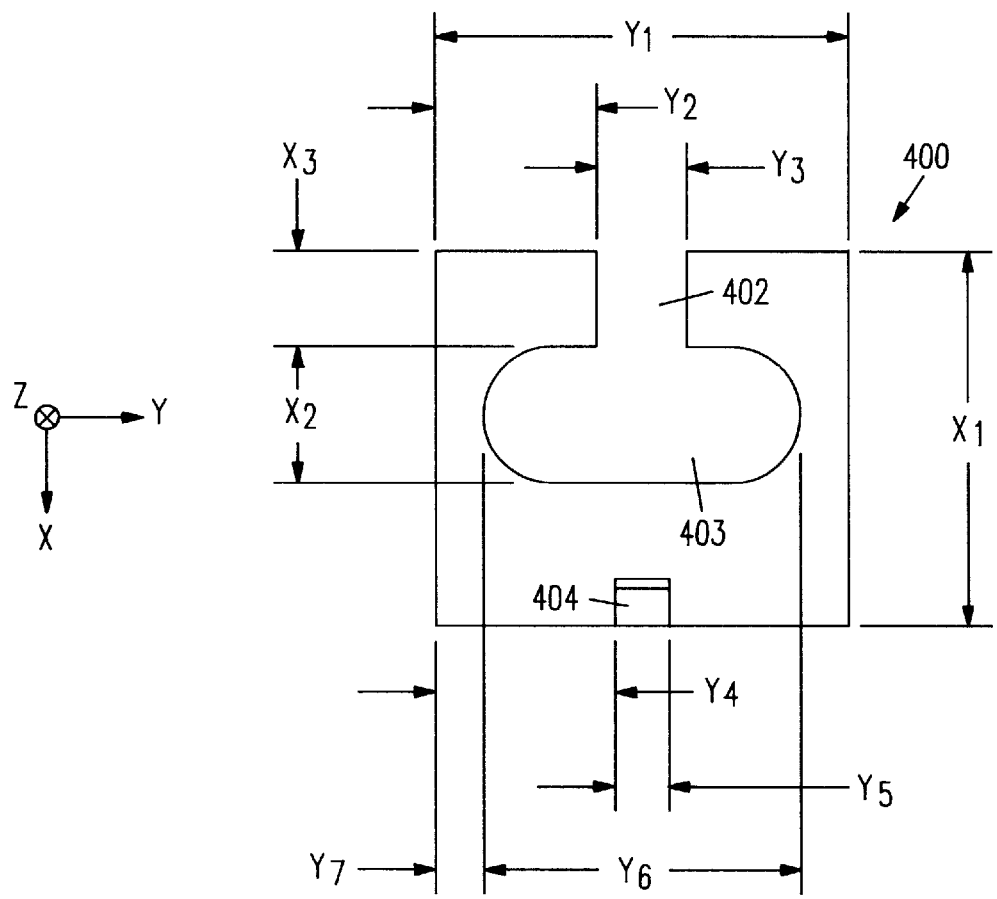
FIGS. 16a, 16b and 16c are front, side and bottom views of the VF drop cable grommet of FIG. 15.
Figure 16B:
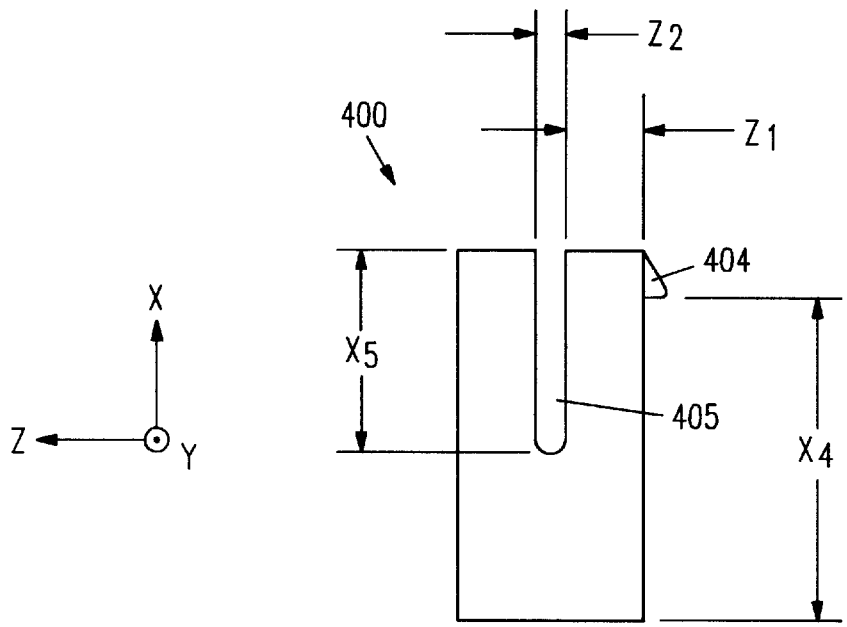
Figure 16C:
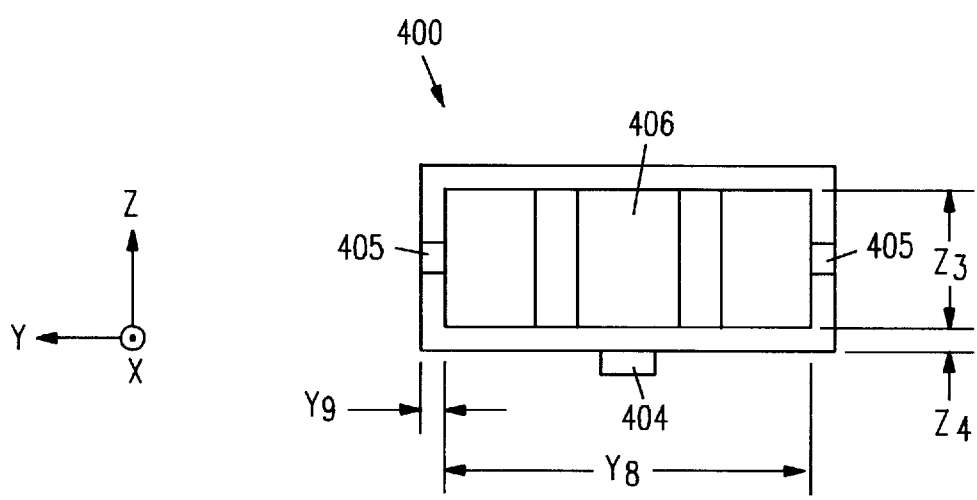
Figure 17:
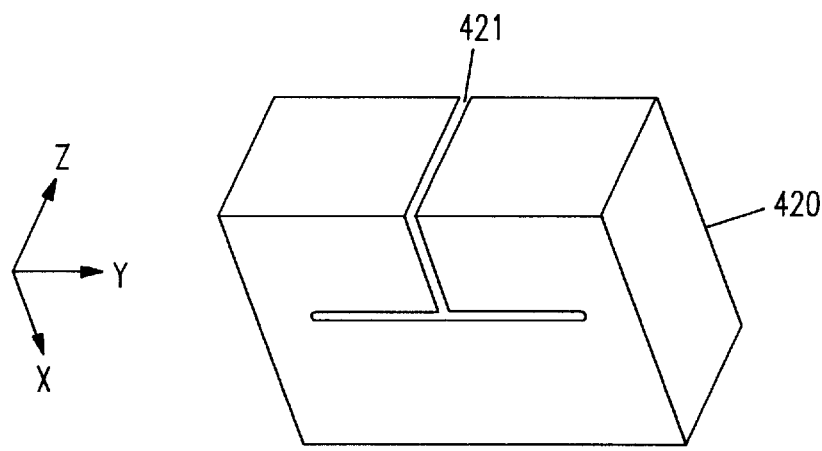
FIG. 17 is an isometric view of an elastomeric filler which is inserted into the VF drop cable grommet of FIG. 15 in accordance with one embodiment of the invention.

FIG. 15 is an isometric view of a VF or power drop cable grommet 400 in accordance with one embodiment of the invention. FIGS. 16a, 16b and 16c are front, side and bottom views of drop cable grommet 400. FIG. 17 is an isometric view of a drop cable grommet filler member 420. Drop cable grommet 400 includes a narrow slot 402 for receiving drop cables. Narrow slot 402 leads to a widened out interior groove 403 which is capable of holding up to three drop cables. A tab 404 is provided on the bottom of grommet 400 to retain grommet 400 within a corresponding one of drop cable grommet slots 122a–122i. Tab 404 engages with a corresponding tab opening in frame 101 (See, e.g., tab opening 124a in FIG. 2) to help retain grommet 400 in a corresponding one of drop cable grommet slots 122a–122i.

Opening 406 is located at the bottom end of grommet 400 to allow the insertion of compliant grommet filler element 420. In a particular embodiment, grommet filler element 420 is a closed cell elastomeric foam, such as EPDM. In another embodiment, the compliant filler element is a molded elastomer. A T-shaped slit 421, which closely follows slots 402 and 403, extends through filler member 420 as illustrated. Longitudinal slots 405 allow the bottom end of grommet 400 to be compressed for improved insertion into drop cable grommet slots 122a–122i. The dimensions of drop cable grommet 400 in accordance with one embodiment of the invention are listed in Table 2.

TABLE 2

| | |
|---|---|
| $X_1$ = 1.340 inches | $Y_1$ = 1.480 inches |
| $X_2$ = 0.500 inches | $Y_2$ = 0.565 inches |
| $X_3$ = 0.350 inches | $Y_3$ = 0.350 inches |
| $X_4$ = 1.165 inches | $Y_4$ = 0.640 inches |
| $X_5$ = 0.750 inches | $Y_5$ = 0.200 inches |
| | $Y_6$ = 1.125 inches |
| $Z_1$ = 0.280 inches | $Y_7$ = 0.178 inches |
| $Z_2$ = 0.100 inches | $Y_8$ = 1.330 inches |
| $Z_3$ = 0.510 inches | $Y_9$ = 0.075 inches |
| $Z_4$ = 0.075 inches | |

Drop cables are driven into grommet 400 in a manner similar to that previously described for coaxial cables and coaxial cable grommets 300. In an alternative embodiment, grommet 400 is modified to include doors which are similar to doors 318a–318d previously described in connection with coaxial cable grommet 300.

Frame 101, which includes compartments 102–103 and partition 199, can be cast molded or formed from a single piece of structural material, such as plastic or aluminum. Alternatively, as illustrated in the cross sectional view of FIG. 18a, dividing partition 199 can be created by joining an electronics/optics compartment 102 which has a partition 199a to a separate drop terminal compartment 103 having a partition 199b. In another embodiment, illustrated in FIG. 18b, dividing partition 199 is made integral with electronics/optics compartment 102. Drop terminal compartment 103 includes a cut-out back section 1910 having extensions 1901 and 1902 which are used to connect compartments 102 and 103. Cut-out back section 1901 reduces the amount of material required to form partition 199, when compared with the embodiment illustrated in FIG. 18a.

Figure 18A:
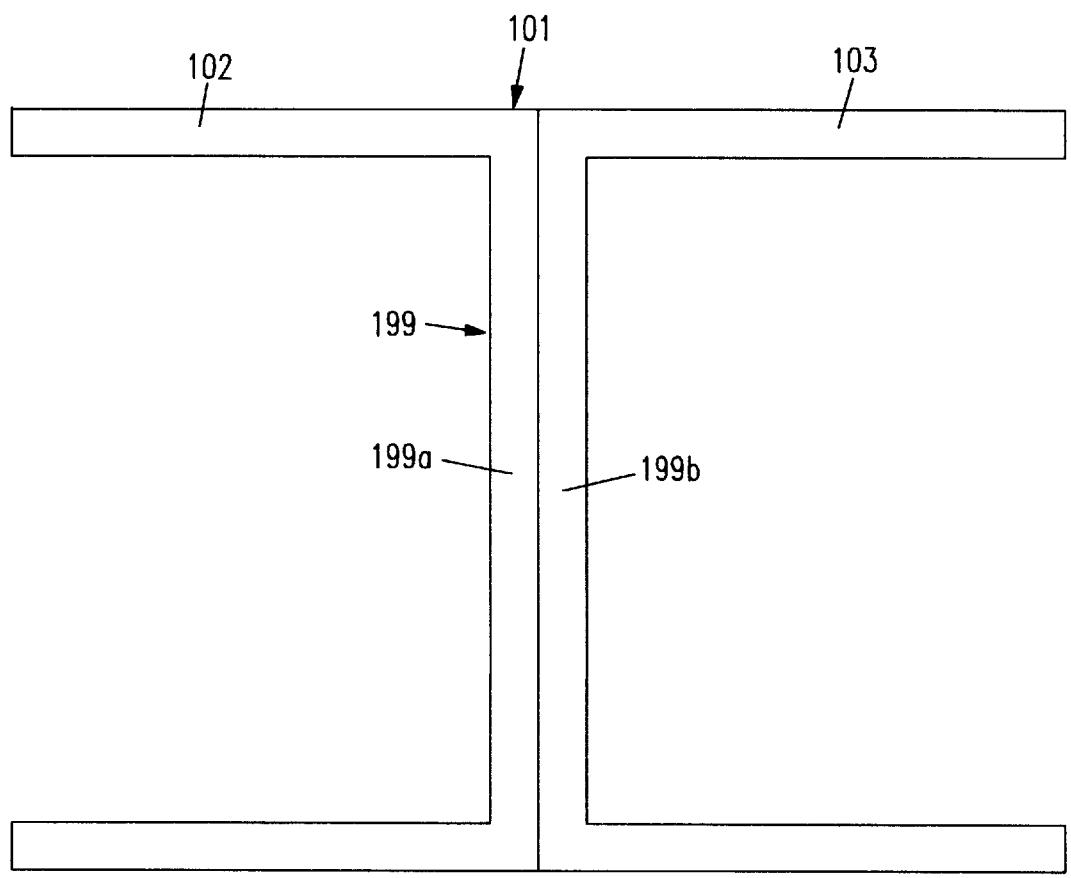
FIGS. 18a and 18b are cross sectional views of frames of an ONU enclosure in accordance with alternative embodiments of the invention.
Figure 18B:
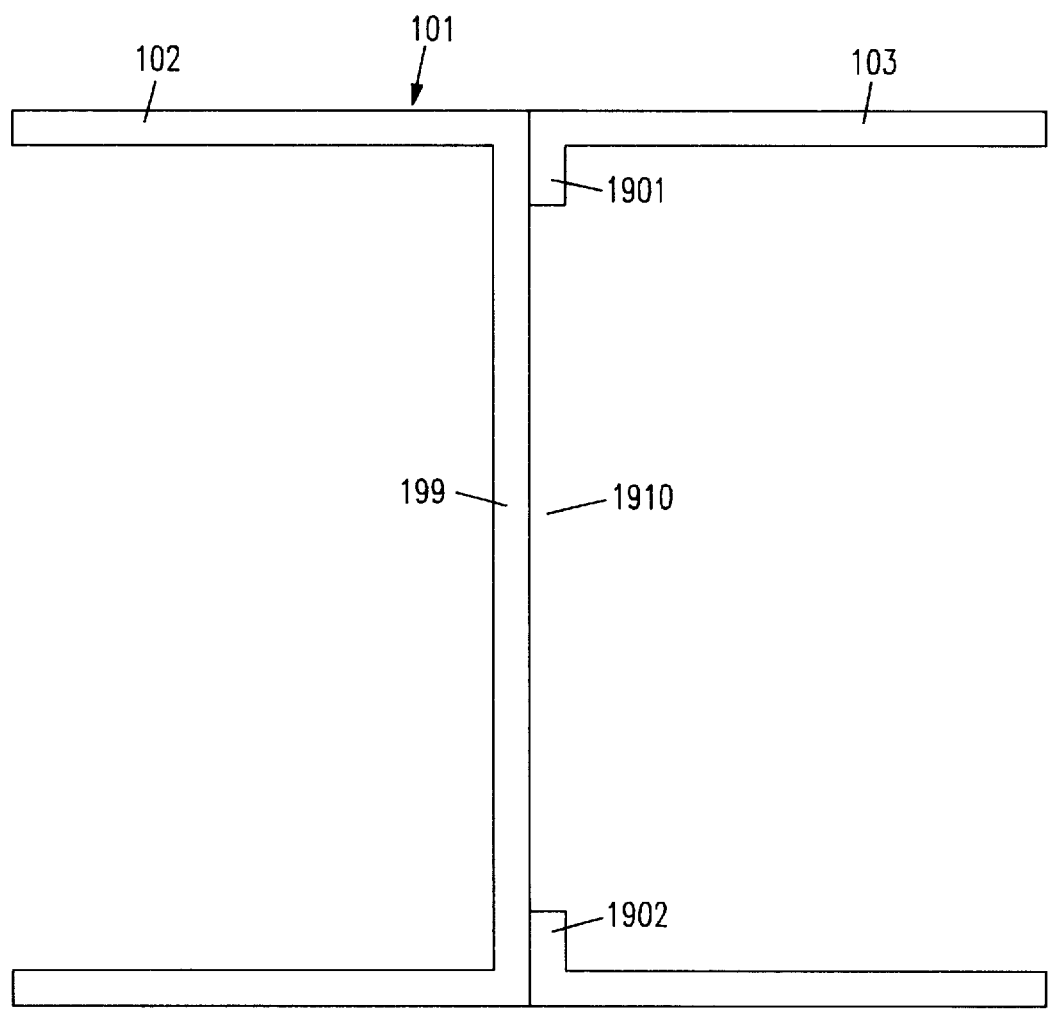

In the embodiments of FIGS. 18a and 18b, compartments 102 and 103 are joined by conventional means, such as structural adhesives, rivets, and/or bolts. All openings in partition 199 include water-tight seals which prevent moisture from passing into compartment 102. In these embodiments, compartments 102 and 103 can be made from similar or different materials.

ONU enclosure 100 can be mounted in several different manners. For example, enclosure 100 can be horizontally mounted on a pedestal or a strand using mounting brackets 140–141. As previously described, mounting brackets 140 and 141 allows ONU enclosure 100 to be mounted by simply slipping these mounting brackets over a cable or similar diameter rod and tightening nuts 140a–141a to secure the brackets 140–141 on the strand or rod. ONU enclosure 100 can be mounted vertically on a vertical pedestal, a wall, or a pole using C-shaped brackets (not shown), which are connected to frame 101 at the same attachment points as mounting brackets 140 and 141. These C-shaped brackets include mounting holes (in lieu of the clamps of mounting brackets 140–141). The mounting holes accept a variety of screws or fasteners for securing the ONU enclosure 100 to the vertical structure. The fasteners are selected in view of the particular vertical structure. For example, three inch lag bolts are used to secure ONU enclosure 100 to a telephone pole, anchor screws are used to secure ONU enclosure 100 to masonry, and wood screws are used to secure ONU enclosure 100 to plywood.

Figure 19:
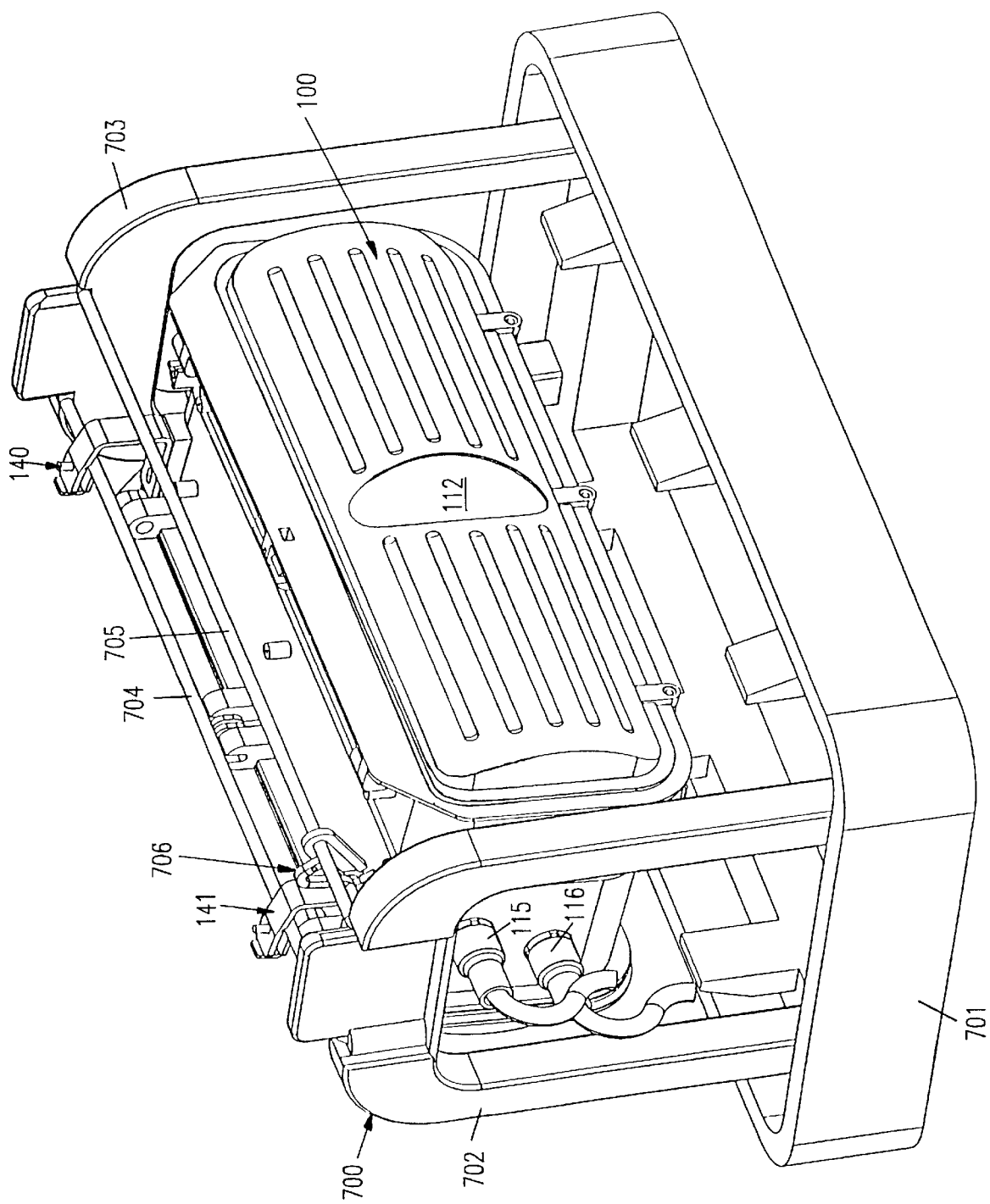
FIG. 19 is an isometric view of a horizontal pedestal mounted ONU enclosure in accordance with one embodiment of the invention.
Figure 20:
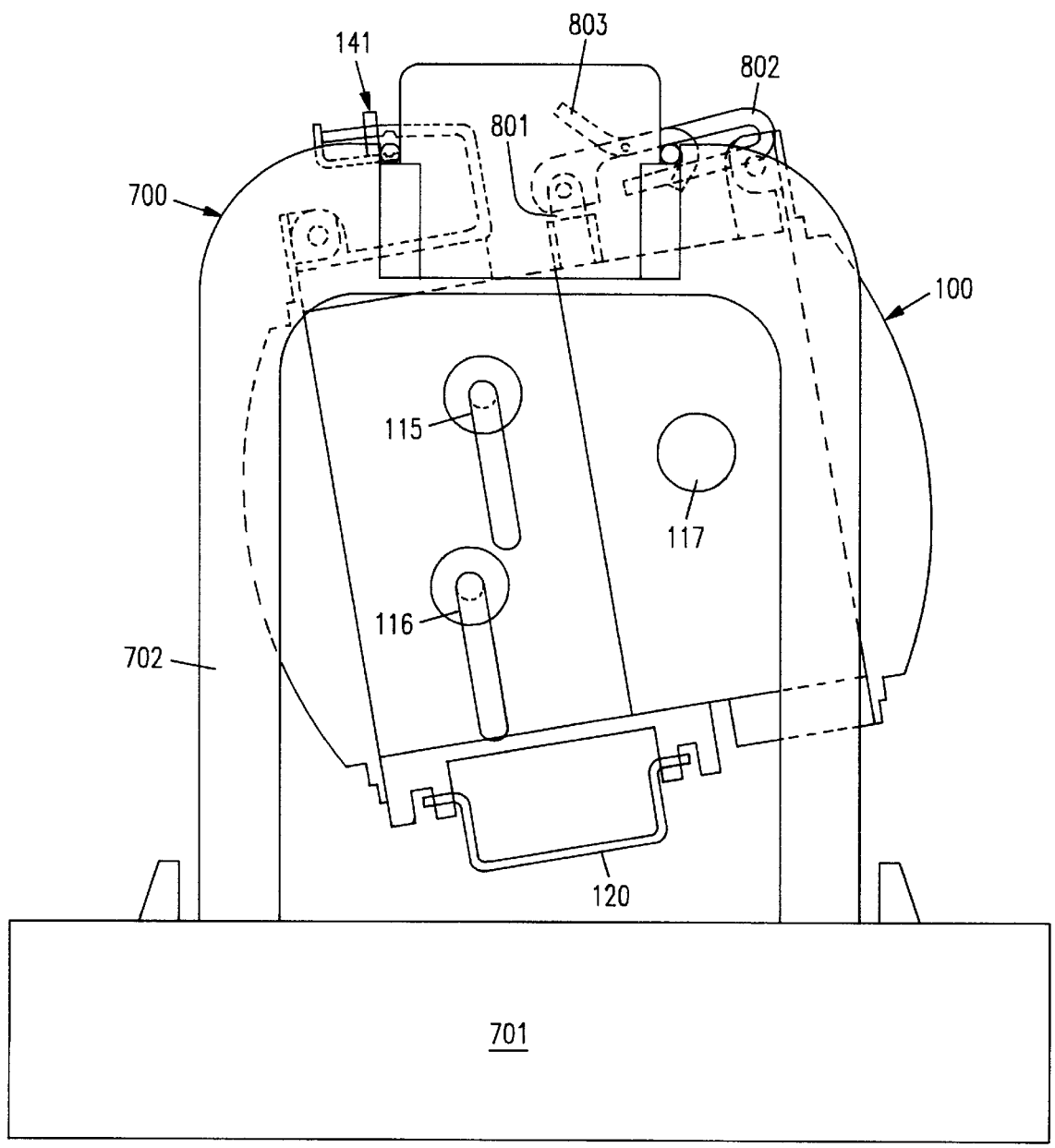
FIG. 20 is a side view of the horizontal pedestal mounted ONU enclosure of FIG. 19 which is held in a raised position by a hook assembly in accordance with one embodiment of the invention.

FIG. 19 illustrates ONU enclosure 100 in a horizontal pedestal mounted configuration. In this embodiment, pedestal 700 includes base 701, supporting arches 702–703 and support rods 704–705. Support rods 704–705 extend horizontally between arches 702–703 as illustrated. Mounting brackets 140–141 of ONU enclosure 100 are connected to support rod 704. While brackets 140–141 support ONU enclosure 100 on support rod 704, these brackets 140–141 do not prevent ONU enclosure 100 from rotating about the axis of support rod 704. Positioning hook assembly 706, which is connected to the upper surface of frame 101, hooks over support rod 705 to hold ONU enclosure 100 in a substantially horizontal position. Pedestal 700 is typically located just above ground level, thereby making access to drop terminal compartment 103 somewhat difficult. To alleviate such a potential difficulty, hook assembly 706 allows ONU enclosure 100 to be rotated upward and held at an angle, thereby providing easy access to drop terminal compartment 103. In one embodiment, hook assembly 706 holds ONU enclosure 100 up at an angle of approximately 35 degrees. The angle provide by hook assembly 706 is typically between 10 and 60 degrees up from the horizontal position. This configuration is illustrated in FIG. 20.

Figure 21:
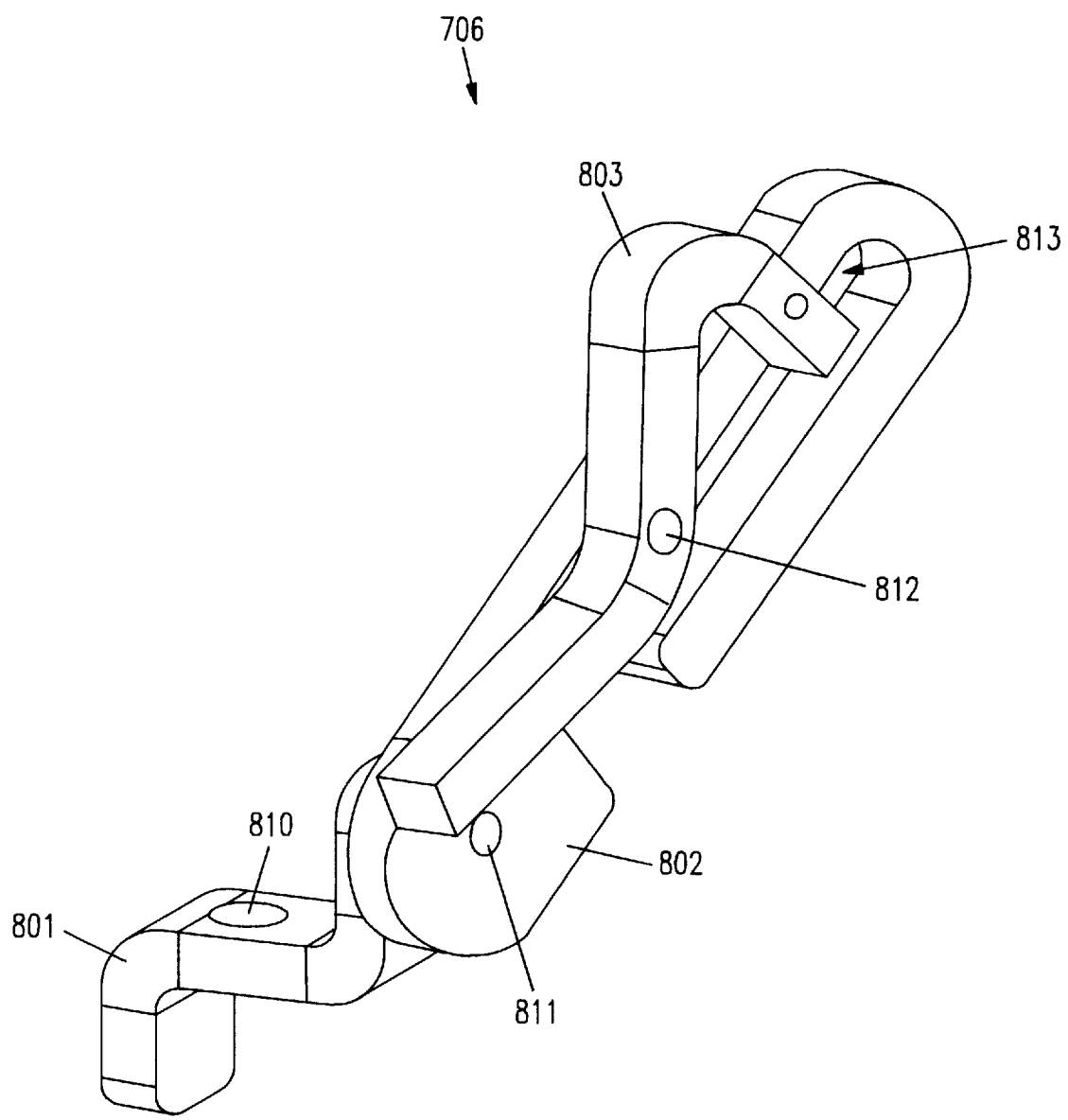
FIG. 21 is an isometric view of the hook assembly shown in FIG. 20.

FIG. 21 is an isometric view of hook assembly 706. Hook assembly 706 includes connector element 801, slide arm 802 and retaining hook 803. Connector element 801 includes a through hole 810 which allows connector element 801 to be connected to the top of frame 101. Connector element 801 is rotatably connected to slide arm 802 at point 811. Slide arm 802 is adapted to receive support rod 705 within slot 813. As shown in FIG. 19, when enclosure 100 is in the horizontal position, support rod 107 is located at the end of slot 813.

Retaining hook 803 is rotatably connected to slide arm 802 at point 812. In the position illustrated in FIG. 21, retaining hook 803 does not obstruct slot 813 of slide arm 802. To hold ONU enclosure 100 up at an angle, the craftsperson rotates enclosure 100 upward such that support rod 705 begins to slide down slide arm 802 within slot 813. When support rod 705 slides past the end of retaining hook 803, retaining hook is rotated down over slot 813. At this time, enclosure 100 is released, such that support rod 705 engages with retaining hook 803. This configuration is illustrated in FIG. 20.

Figure 22:
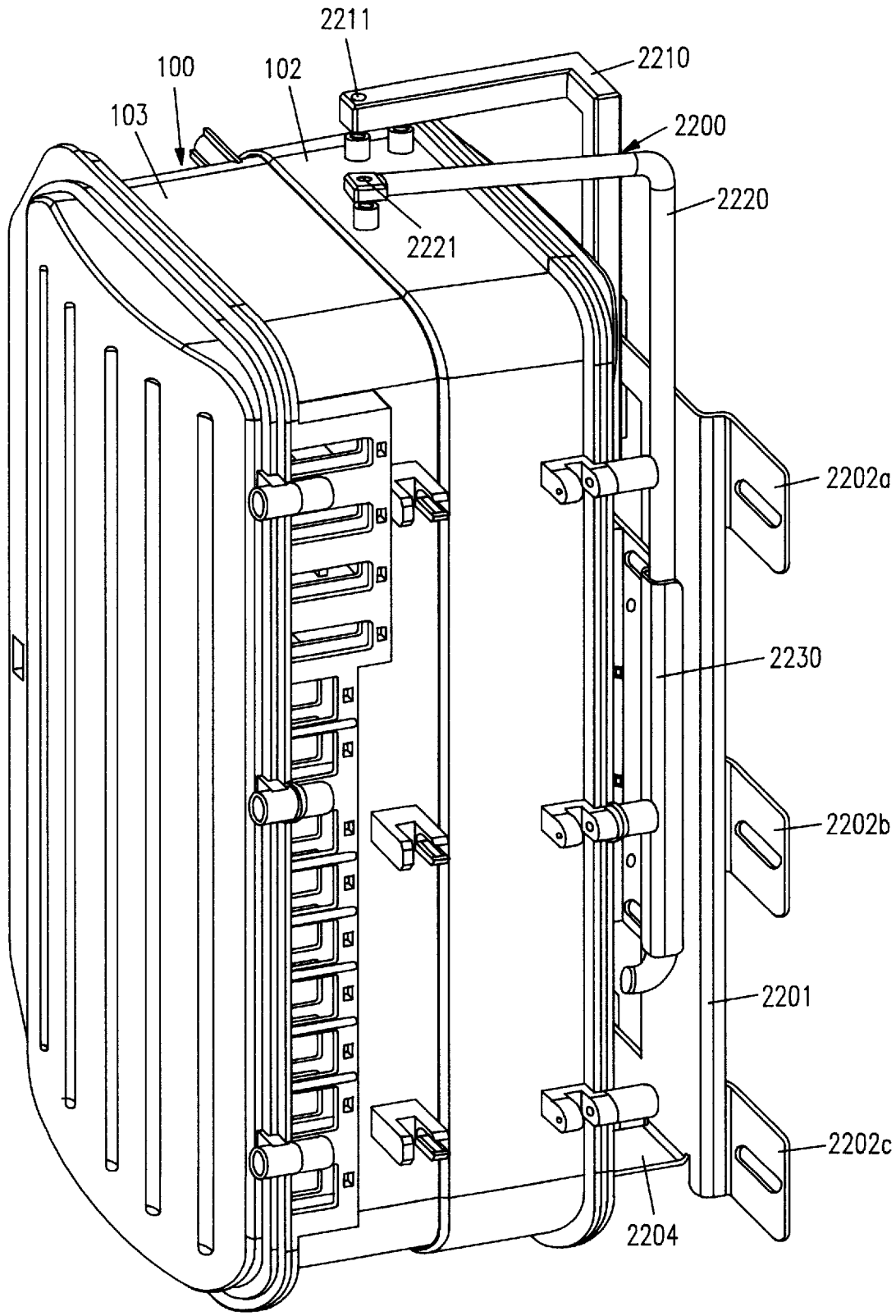
FIG. 22 is an isometric view of an ONU enclosure in accordance with the present invention being vertically mounted with a pivoting clamp.
Figure 23:
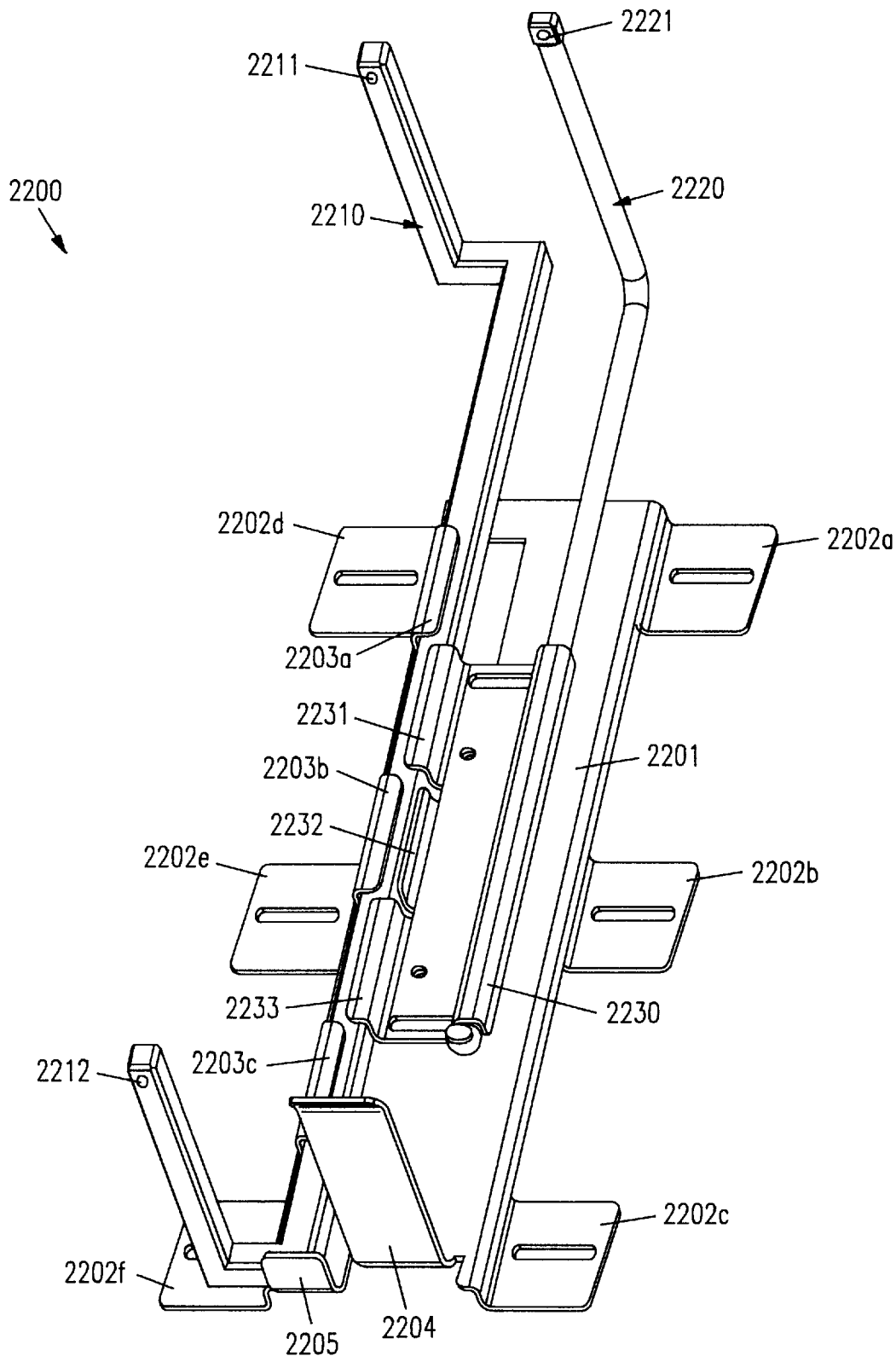
FIG. 23 is an isometric view of the pivoting clamp of FIG. 22.

FIG. 22 illustrates ONU enclosure 100 mounted vertically by pivoting mounting bracket 2200. FIG. 23 illustrates mounting bracket 2200 in greater detail. Mounting bracket 2200 includes four main pieces: main bracket 2201, support bracket 2210, security bracket 2220 and slidable capture bracket 2230. Main bracket 2201 includes mounting flanges 2202a–2202f, retaining fingers 2203a–2203c and support flanges 2204 and 2205. Support bracket 2210 is dimensioned to fit into retaining fingers 2203a–2203c of main bracket 2201. Support bracket 2210 includes openings 2211 and 2212 which receive fasteners which connect support bracket 2210 to corresponding openings in ONU enclosure 100. Capture bracket 2230 is mounted on main bracket 2201. Capture bracket 2230 includes fingers 2231–2233 which are dimensioned to fit over support bracket 2210. Security rod 2220, which fits between capture bracket 2230 and main bracket 2201, includes an opening 2221 which receives a fastener which connects security rod 2220 to a corresponding opening in ONU enclosure 100.

Vertical mounting bracket 2200 is installed as follows. Main bracket 2201 is connected to the vertical mounting surface by inserting fasteners through the openings in mounting flanges 2202a–2202f. Support bracket 2210, which at this time is separate from the other elements of bracket 2200, is connected to ONU enclosure 100 with fasteners which extend through openings 2211 and 2212. Support bracket 2210 is then positioned on support flange 2205 and under fingers 2203a–2203c of main bracket. Capture bracket 2230 is then positioned such that fingers 2231–2233 are held against support bracket 2210. Capture bracket 2230 is further positioned to retain security rod 2220. Capture bracket 2230 is then secured to main bracket 2201, thereby holding support bracket 2210 and security rod 2220 in place. Security rod 2220 can be slid up and down within capture bracket 2230. Security rod 2220 can be connected to ONU enclosure 100 by inserting a fastener through opening 2221. FIG. 22 illustrates ONU enclosure 100 coupled to mounting bracket 2200.

When fastened, security rod 2220 prevents ONU enclosure 100 from being pivoted away from main frame 2201. The bottom edge of ONU enclosure 100 rests on support flange 2204. The fastener used to connect security rod 2220 to ONU enclosure 100 is a typically a locking fastener, such as a security washer, to prevent unauthorized persons from accessing electronics/optics compartment 102. When security rod 2220 is released from ONU enclosure 100, ONU enclosure 100 is free to pivot about the axis defined by openings 2211 and 2212 of security bracket 2210. By pivoting ONU enclosure 100 about this axis, a craftsperson can gain access to electronics/optics compartment 102.

Although the invention has been described in connection with several embodiments, it is understood that this invention is not limited to the embodiments disclosed, but is capable of various modifications which would be apparent to one of ordinary skill in the art. For example, ONU enclosure 100 could easily be modified to service other numbers of optical fibers, coaxial cables or VF twisted pair conductors or power twisted pair conductors for external electronics. Thus, the invention is limited only by the following claims.

What is claimed is:

1. An enclosure for an optical network unit (ONU) comprising:
    a frame having a first opening and a second opening opposite the first opening;
    a partition dividing the frame into a first compartment for housing electronics and optics of the ONU and a second compartment for housing drop terminals of the ONU;
    a first door coupled to the frame, the first door covering the first opening and enclosing the first compartment; and
    a second door coupled to the frame, the second door covering the second opening and enclosing the second compartment.

2. The enclosure of claim 1, wherein the first door opens about a first axis and the second door opens about a second axis, the first and second axes being substantially parallel.

3. The enclosure of claim 2, wherein the first door opens in a first direction about the first axis and the second door opens in a second direction, opposite the first direction, about the second axis.

4. The enclosure of claim 1, further comprising a first opening in the first compartment for receiving an optical fiber.

5. The enclosure of claim 4, further comprising a second opening in the first compartment for receiving a power supply line which provides power to the ONU.

6. The enclosure of claim 4, further comprising a water-tight seal located between the first opening in the first compartment and the optical fiber.

7. The enclosure of claim 5, further comprising a water-tight seal located between the second opening in the first compartment and the power supply line.

8. The enclosure of claim 4, further comprising a fiber routing structure located on the exterior of the frame, the fiber routing structure being adapted to route the optical fiber through the first opening in the first compartment to the exterior of the frame, the fiber routing structure being dimensioned to prevent the optical fiber from bending past a minimum bend radius of the optical fiber.

9. The enclosure of claim 4, further comprising a first opening in the partition which is adapted for receiving a plurality of twisted pair conductors.

10. The enclosure of claim 9, further comprising a water-tight seal located between the first opening in the partition and a plurality of twisted pair conductors which pass through the first opening in the partition.

11. The enclosure of claim 9, further comprising one or more drop terminal blocks located in the second compartment, the drop terminal blocks being adapted to receive a plurality of twisted pair conductors from the first opening in the partition.

12. The enclosure of claim 1, further comprising a mounting plate located in the second compartment, the mounting plate being adapted for supporting one or more drop terminal blocks.

13. The enclosure of claim 12, wherein the mounting plate is removable.

14. The enclosure of claim 12, wherein the mounting plate is connected within the second compartment by a hinge.

15. The enclosure of claim 12, wherein the mounting plate is adapted to support different types of drop terminal blocks.

16. The enclosure of claim 1, further comprising
    a slot located in the second compartment; and
    a compliant grommet which is sized for insertion and removal from the slot, the grommet having a groove for receiving and retaining one or more voice frequency drop cables.

17. The enclosure of claim 16, wherein the grommet comprises a grommet frame and a compliant filler which is located within the grommet frame, wherein the compliant filler deforms to receive one or more drop cables.

18. The enclosure of claim 17, wherein the grommet further comprises a tab protruding from the grommet frame for retaining the grommet in the slot.

19. The enclosure of claim 1, further comprising a plurality of coaxial cable bulkhead connectors which extend through the partition into the first and second compartments.

20. The enclosure of claim 19, wherein the coaxial cable bulkhead connectors and the partition do not allow moisture to pass between the first and second compartments.

21. The enclosure of claim 1, further comprising
a slot which is located in the second compartment; and
a compliant grommet which is sized for insertion and removal from the slot, the grommet having a grooved slot for receiving and retaining one or more coaxial cables.

22. The enclosure of claim 21, wherein the grommet comprises a grommet frame having a grooved slot and a compliant filler which is located within the grommet frame, wherein the compliant filler deforms to receive one or more coaxial cables.

23. The enclosure of claim 22, wherein the grommet further comprises a tab protruding from the grommet frame for retaining the grommet in the slot.

24. The enclosure of claim 1, further comprising a plurality of mounting brackets coupled to the frame, the mounting brackets being capable of supporting the enclosure horizontally.

25. The enclosure of claim 24, wherein the mounting brackets comprise a plurality of clamps which can be attached to an external mounting structure.

26. The enclosure of claim 24, further comprising a hook assembly coupled to the frame, the hook assembly being adapted to hold the enclosure in a first position and a second position, the first position being a substantially horizontal position and the second position being located at an angle with respect to the first position.

27. The enclosure of claim 24, wherein the second compartment is tilted upward when the hook assembly is in the second position.

28. The enclosure of claim 24, wherein the angle is between 10 and 60 degrees up from the horizontal position.

29. The enclosure of claim 1, further comprising one or more mounting brackets coupled to the frame, the one or more mounting brackets being capable of supporting the enclosure vertically.

30. The enclosure of claim 29, wherein the one or more mounting brackets comprise C-shaped clamps.

31. The enclosure of claim 29, wherein the one or more mounting brackets are pivotally coupled to the frame.

32. The enclosure of claim 31, further comprising a security element coupled to the frame, wherein said security element prevents the frame from pivoting about the one or more mounting brackets.

33. The enclosure of claim 1, wherein the first and second doors overlap the frame when the first and second doors are opened in an upward direction, thereby preventing water from entering the first and second compartments when the enclosure is mounted horizontally.

34. The enclosure of claim 1, further comprising a plurality of cable guides connected to the frame for retaining a plurality of coaxial cables and drop cables.

35. The enclosure of claim 1, further comprising a first lock for locking the first door and a second lock for locking the second door.

36. The enclosure of claim 35, wherein the first lock and the second lock are different types of locks.

37. The enclosure of claim 35, wherein the first and second locks comprise security screws.

38. The enclosure of claim 1, further comprising a gasket for providing a water-tight seal between the first door and the frame when the first door is closed.

39. The enclosure of claim 1, further comprising a gasket for providing a seal between the second door and the frame when the second door is closed.

40. The enclosure of claim 1, further comprising a support plate coupled to the partition within the first compartment, the support plate providing a mechanical structure for mounting a plurality of electronics/optics devices within the first compartment.

41. The enclosure of claim 40, further comprising a printed circuit board connected to the support plate, the printed circuit board providing interconnections between the electronics/optics devices mounted on the support plate.

42. The enclosure of claim 41, further comprising alignment means for blind-mating the electronics/optics devices to the printed circuit board.

43. The enclosure of claim 41, further comprising connector rods extending from the support plate, wherein the connector rods are located in corresponding openings in one or more of the electronics/optics devices, thereby providing blind mating between the electronics/optics devices and the printed circuit board.

44. The enclosure of claim 41, wherein the support plate and printed circuit board are removable for use outside of the enclosure.

45. The enclosure of claim 40, further comprising a plurality of coaxial cable bulkhead connectors extending through the partition, wherein the support plate further comprises a corresponding plurality of openings for receiving the coaxial cable bulkhead connectors.

46. The enclosure of claim 1, further comprising a solar panel coupled to an exterior surface of the frame for reducing the temperature of the enclosure, the solar panel extending over the frame.

47. The enclosure of claim 1, further comprising:
a first catch coupled to the first door, wherein the first catch holds the first door in an open position; and
a second catch coupled to the second door, wherein the second catch holds the second door in an open position.

48. The enclosure of claim 1, further comprising a first opening in the second compartment which is adapted to receive a bundled plurality of twisted pair conductors.

49. The enclosure of claim 48, further comprising a plug located in the first opening of the second compartment.

50. The enclosure of claim 1, wherein the frame and the partition are formed from a single piece of structural material.

51. The enclosure of claim 1, wherein the frame comprises:
a first compartment structure having a first backplate, the first compartment structure exhibiting the first opening; and
a second compartment structure having a second backplate, the second compartment structure exhibiting the second opening, the first backplate being connected to the second backplate, wherein the connected first and second backplates form the partition.

52. The enclosure of claim 1, wherein the frame comprises:
a first compartment structure having a first backplate, the first compartment structure exhibiting the first opening; and
a second compartment structure having openings at two ends, wherein one of the open ends of the second compartment is connected to the backplate of the first compartment.

* * * * *